Patented Oct. 16, 1951

2,571,120

UNITED STATES PATENT OFFICE 2,571,120

OXYALKYLATED DERIVATIVES OF CERTAIN INTERMEDIATES OBTAINED FROM CERTAIN CARBOXYL-CONTAINING XYLENE-SOLUBLE RESINS

Melvin De Groote, University City, and Bernhard Keiser, Webster Groves, Mo., assignors to Petrolite Corporation, Ltd., Wilmington, Del., a corporation of Delaware No Drawing. Original application February 21, 1950, Serial No. 145,579. Divided and this application August 30, 1950, Serial No. 182,165

15 Claims. (Cl. 260—19)

The present application is concerned with hydrophile synthetic products; said hydrophile synthetic products being oxyalkylation products of the acylation product obtained by reacting (a) a fusible, carboxyl-containing, xylene-soluble, water-insoluble, acid-catalyzed, low-stage phenol-aldehyde resin; said resin being derived by reaction between a mixture of a difunctional monohydric hydrocarbon-substituted phenol and salicylic acid on the one hand, and an aldehyde having not over 8 carbon atoms and reactive towards both components of the mixture on the other hand, the amount of salicylic acid employed in relation to the noncarboxylated phenol being sufficient to contribute at least one salicylic acid radical per resin molecule; said resin being formed in the substantial absence of trifunctional phenols, and said phenol being of the formula

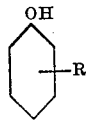

in which R is a hydrocarbon radical having at least 4 and not more than 14 carbon atoms and substituted in the 2,4,6 position; and (b) an acylation-susceptible chemical compound in which the elements are composed exclusively of members selected from the class consisting of carbon, hydrogen, oxygen, nitrogen, and sulfur, and chlorine, with the proviso that the molecular weight of such second reactant shall not be over 25,000.

Attention is directed to our co-pending application, Serial No. 137,293, filed January 6, 1950. Said application describes a fusible, carboxyl-containing, xylene-soluble, water-insoluble, acid-catalyzed, low-stage phenol-aldehyde resin; said resin being derived by reaction between a mixture of a difunctional monohydric hydrocarbon-substituted phenol and salicylic acid on the one hand, and an aldehyde having not over 8 carbon atoms and reactive towards both components of the mixture on the other hand; the amount of salicylic acid employed in relation to the noncarboxylated phenol being sufficient to contribute at least one salicylic acid radical per resin molecule; said resin being formed in the substantial absence of trifunctional phenols, and said phenol being of the formula

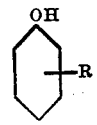

in which R is a hydrocarbon radical having at least 4 and not more than 14 carbon atoms and substituted in the 2,4,6 position. See additionally our co-pending application, Serial No. 8,722, filed February 6, 1948, now Patent 2,499,365, granted March 7, 1950.

The carboxyl-containing xylene-soluble resin of the kind described can be reacted with a variety of compounds reactive towards carboxyl radicals, such as compounds having a hydroxyl radical, an amino radical, an amido radical, a sulfonamide or derivative thereof, or a combination of such radicals or similarly reactive radicals. Such hydroxylated compounds may be composed of carbon, hydrogen and oxygen only or may additionally have some other element, such at nitrogen, sulfur, chlorine, etc. In fact, it is not necessary that oxygen be present, as in the case of an amine or ammonia. Stated another way, such carboxyl may be reactive towards any compound having either a hydroxyl or an amino or nitrogen atom, or both, or other obvious equivalents.

This broad invention is generic to at least three sub-genera. One sub-genus is concerned with acylation-susceptible compounds derived from a carboxyl-containing resin and a second reactant containing carbon, hydrogen and oxygen only.

A second sub-genus of the present invention is concerned with such instances where the acylation-susceptible compounds, either organic or inorganic, contain nitrogen.

A third sub-genus of the broad invention is concerned with certain products of acylation-susceptible organic compounds in which there is present at least one element other than carbon and hydrogen, and either oxygen or nitrogen, or both, said other element being selected from the class consisting of sulfur and chlorine.

The method of preparation of all the compounds within the generic class is essentially the same. The first step is to obtain and prepare a fusible, carboxyl-containing, xylene-soluble, resin; and then react the resin with an acylation-susceptible compound of the kind previously described, and particularly an organic compound having a molecular weight under 25,000. The result of such acylation reaction, which may be esterification or amidification, or both, is an acylation product or intermediate.

Having obtained such intermediate product by reaction with the carboxyl radical of the xylene-soluble resin; the next step involves reaction with an alkylene oxide such as ethylene oxide, propylene oxide, butylene oxide, glycide and methylglycide.

For all practical purposes such oxyalkylations are conducted in a conventional manner. The oxyalkylated derivatives so obtained are employed for the resolution of petroleum emulsions of the water-in-oil type. The oxyalkylated derivatives may be used for a variety of purposes, other than demulsification, where surface-active materials are of value as, for example, producing emulsions, detergents, agricultural sprays, further reaction with chemical compounds reactive towards hydroxyl radicals, etc.

Specifically, the use of such oxyalkylated derivatives is not limited to the resolution of petroleum emulsions of the water-in-oil type.

The carboxyl-containing xylene-soluble resins which we use as intermediates for preparing the products of the present invention are described in our application Serial No. 137,293, filed January 6, 1950, and reference is made to that application for a complete and full description of these resins and to Examples 6a through 24a for specific examples of suitable resins.

To produce the products of the present invention, these resins are reacted with acylation-susceptible materials reactive with the carboxyl groups present in the resin. In describing suitable acylation-susceptible materials, to illustrate the invention, we will first describe acylation with suitable compounds containing only carbon, hydrogen and oxygen, then acylation with compounds containing nitrogen, then acylation with compounds containing chlorine or sulfur, and then describe the oxyalkylation of these intermediates to produce the oxyalkylated products of the invention.

COMPOUNDS CONTAINING CARBON, HYDROGEN, AND OXYGEN ONLY

The intermediates are prepared by conventional acylation reactions employing carboxyl-containing xylene-soluble resins described in application S. N. 137,293, along with hydroxylated reactants containing carbon, hydrogen and oxygen only. Where the reaction involves a hydroxyl radical free from other interfering radicals as in the case of a monohydric alcohol, polyhydric alcohol, fractional ester, or the like, one can employ any conventional procedure, but the one referred to is a customary esterification reaction employing an acid catalyst. Other obvious equivalents suggest themselves such as reaction with a polyhydric alcohol followed by subsequent reaction with a high molal monocarboxy acid. There is nothing to be gained, however, by employing such added step.

For convenience, we have used a conventional two-piece laboratory resin pot. The cover part of the equipment had four openings: One for reflux condenser; one for the stirring device; one for a separatory funnel or other means of adding reactants; and a thermometer well. In the manipulation employed, the separatory funnel insert for adding reactants was not used. The device was equipped with a combination reflux and water-trap apparatus so that the single piece of apparatus could be used as either a reflux condenser or a water trap, depending on the position of the three-way glass stopcock. This permitted convenient with withdrawal from the water trap. The equipment, furthermore, permitted any setting of the valve without disconnecting the equipment. The resin pot was heated with a glass fiber electrical heater constructed to fit snugly around the resin pot. Such heaters, with regulators, are readily available.

The selected resin, either dissolved in xylene or with xylene added, was placed in the resin pot along with the selected hydroxylated reactant and a small amount of catalyst, usually para-toluene sulfonic acid. The mixture was refluxed and stirred during the entire procedure.

When the phase-separating trap showed that the amount of water separated was approximately that expected from reaction the operation was stopped. The intermediate so obtained was, of course, dissolved in xylene. The xylene was readily removable by vacuum distillation although for subsequent reaction with an alkylene oxide there is no objection to its presence.

The subsequent tables show the particular resin employed and the amount, the hydroxylated reactant and amount, the amount of catalyst employed (para-toluene sulfonic acid), added solvent and amount, the ratio between available hydroxyls and carboxyls, the approximate reflux temperature, time of refluxing, the amount of water evolved, and the appearance of the final product. The data are in essence self-explanatory.

| Ex. No. | Reactant for Combination with Carboxyl Group | Amt. of Reactant Employed, Grams | Carboxylic Resin,[1] | Amt. of Resin, Grams | Amt. of Acid Catalyst, Grams | Amt. of Solvent, Grams | Ratio of Carboxyl to Hydroxyl | Reflux Temp., °C. | Time, in hrs. | Water out, c. c. | Appearance of Solvent Free Ester | Solubility of Solvent Free Ester |
|---|---|---|---|---|---|---|---|---|---|---|---|---|
| 1b | Carbowax 4000 mono-stearate. | 418 | 7a | 85.5 | 5 | 90.1 | 1:1 | 170 | 4½ | 7.7 | Dk. brown tacky Solid. | Wtr.-dispersible foam. |
| 2b | Carbowax 4000 mono-oleate. | 418 | 7a | 85.5 | 5 | 96 | 1:1 | 174 | 4½ | 10.4 | ___do___ | Do. |
| 3b | Ethylene glycol mono-oleate. | 85.2 | 7a | 228 | 5 | 160 | 1:1 | 168 | 4½ | 5.9 | ___do___ | Do. |
| 4b | Ethylene glycol mono-stearate. | 89.3 | 7a | 228 | 5 | 160 | 1:2 | 161 | 5¼ | 9.8 | ___do___ | Do. |
| 5b | Glycerol mono-oleate_. | 93.3 | 7a | 228 | 5 | 197.7 | 1:2 | 153 | 5¼ | 8.6 | ___do___ | Do. |
| 6b | Diethylene glycol mono-ricinoleate. | 101 | 7a | 228 | 5 | 157 | 1:1 | 162 | 4 | 7.1 | Dk. brown soft. sol. | Wtr.-dispersible. |
| 7b | Glycerol mono-oleate_. | 93 | 7a | 228 | 5 | 152 | 1:1 | 162 | 4 | 7.8 | ___do___ | Do. |
| 8b | Glyceryl dioleate_____ | 162 | 7a | 228 | 5 | 160 | 1:1 | 162 | 4½ | 6.5 | Dk. brown tacky sol. | Sltly. water dispersible. |
| 9b | Carbowax 4000 mono-stearate. | 392 | 10a | 75 | 5 | 67.0 | 1:1 | 174-182 | 6 | 10.4 | ___do___ | Wtr.-dispersible foams. |

[1] Example number is that of S. N. 137,293.

| Ex. No. | Reactant for Combination with Carboxyl Group | Amt. of Reactant Employed, Grams | Carboxylic Resin,[1] | Amt. of Resin, Grams | Amt. of Acid Catalyst, Grams | Amt. of Solvent, Grams | Ratio of Carboxyl to Hydroxyl | Reflux Temp., °C. | Time, in hrs. | Water out, c. c. | Appearance of Solvent Free Ester | Solubility of Solvent Free Ester |
|---|---|---|---|---|---|---|---|---|---|---|---|---|
| 10b | Carbox 4000 monooleate. | 392 | 10a | 75 | 5 | 43.0 | 1:1 | 176–182 | 6¼ | 12.0 | Dk. brown Visc. Liq. | Wtr.-dispersible. |
| 11b | Ethylene glycol diricinoleate. | 162 | 7a | 228 | 5 | 145 | 1:2 | 164 | 4¾ | 8.4 | Tacky solid | Sltly. water dispersible. |
| 12b | Ethylene glycol diricinoleate. | 152 | 9a | 200 | 5 | 185 | 1:2 | 157 | 4½ | 8.3 | Brittle solid | Do. |
| 13b | Ethylene glycol diricinoleate. | 145 | 12a | 244 | 5 | 129 | 1:2 | 158 | 5½ | 8.7 | do | Do. |
| 14b | Propylene glycol diricinoleate. | 166 | 7a | 230 | 5 | 146 | 1:2 | 156 | 5½ | 8.8 | do | Do. |
| 15b | Propylene glycol diricinoleate. | 156 | 9a | 200 | 5 | 185 | 1:2 | 159 | 5¼ | 8.5 | do | Do. |
| 16b | Propylene glycol diricinoleate. | 149 | 12a | 245 | 5 | 130 | 1:2 | 160 | 5¼ | 8.2 | do | Do. |
| 17b | Ethylene glycol di(hydroxystearate). | 162 | 7a | 227 | 5 | 145 | 1:2 | 163 | 5¾ | 7.3 | do | Do. |
| 18b | Ethylene glycol di(hydroxystearate). | 152 | 9a | 201 | 5 | 185 | 1:2 | 163 | 6 | 7.6 | do | Do. |
| 19b | Stearic acid ester of ethylene glycol monoricinoleate. | 153 | 7a | 230 | 5 | 150 | 1:1 | 170 | 5¼ | 5.8 | Dk. brown solid. | Insoluble. |
| 20b | Oleic acid ester of ethylene glycol monoricinoleate. | 153 | 8a | 255 | 5 | 171 | 1:1 | 172 | 5½ | 5.7 | do | Do. |
| 21b | Linoleic acid ester of ethylene glycol monoricinoleate. | 152 | 9a | 215 | 5 | 180 | 1:1 | 168 | 4¾ | 4.9 | do | Do. |
| 22b | Oleic acid ester of diethylene glycol monoricinoleate. | 165 | 12a | 240 | 5 | 155 | 1:1 | 165 | 6¼ | 6.0 | do | Insol. Sltly tendency to disperse. |
| 23b | Oleic acid ester of diethylene glycol mono-(hydroxystearate). | 165 | 7a | 231 | 5 | 165 | 1:1 | 161 | 5½ | 6.6 | do | Do. |
| 24b | Oleic acid ester of triethylene glycol monoricinoleate. | 175 | 8a | 257 | 5 | 145 | 1:1 | 163 | 4¼ | 4.8 | Dk. brown tacky solid. | Insol. Def. tendency to disperse. |
| 25b | Octa-decanol | 53 | 7a | 171 | 5 | 200 | 1:1 | 148 | 5½ | 3.0 | Dk. brown brittle solid. | Insoluble. |
| 26b | Dodecanol | 37 | 7a | 171 | 5 | 177 | 1:1 | 149 | 5½ | Over 20 (leak) | do | Do. |
| 27b | Dodecenol | 53 | 7a | 171 | 5 | 175 | 1:1 | 153 | 5½ | 2.9 | do | Do. |
| 28b | Octanol | 26 | 7a | 171 | 5 | 179 | 1:1 | 145 | 5½ | 3.6 | do | Do. |
| 29b | Cetyl alcohol | 63 | 7a | 228 | 5 | 210 | 1:1 | 152 | 6 | 3.1 | do | Do. |
| 30b | Nonyl alcohol | 38 | 7a | 228 | 5 | 152 | 1:1 | 157 | 5¼ | 3.2 | do | Do. |
| 31b | Octadecanol | 66 | 9a | 200 | 5 | 205 | 1:1 | 148 | 5¾ | 4.2 | do | Do. |
| 32b | Dodecanol | 46 | 9a | 200 | 5 | 203 | 1:1 | 148 | 5½ | 4.4 | do | Do. |
| 33b | Octadecanol | 65 | 9a | 200 | 5 | 196 | 1:1 | 146 | 5¼ | 7.2 | do | Do |
| 34b | 2,ethyl butyl alcohol | 25 | 9a | 200 | 5 | 190 | 1:1 | 144 | 6¼ | 5.6 | do | Do. |
| 35b | P rified octadecanol alcohol. | 66 | 9a | 200 | 5 | 174 | 1:1 | 150 | 6 | 5.5 | do | Do. |
| 36b | Ricinoleic Acid | 78.0 | 7a | 228 | 5 | 162 | 1:1 | 157 | 4½ | 9.3 | do | Tends to disperse slightly. |
| 37b | Glycollic | 18.8 | 7a | 228 | 5 | 164 | 1:1 | 148 | 4½ | 7.2 | do | Do. |
| 38b | Hydroxy decanoic | 49.0 | 7a | 228 | 5 | 151 | 1:1 | 159 | 4½ | 6.6 | do | Do. |
| 39b | Ricinoleic | 73.1 | 9a | 200 | 5 | 184 | 1:1 | 147 | 4¾ | 7.1 | do | Do. |
| 40b | Glycollic | 18.7 | 9a | 200 | 5 | 192 | 1:1 | 144 | 4¾ | 7.5 | do | Insoluble. |
| 41b | Hydroxy decanoic | 71.0 | 9a | 200 | 5 | 371 | 1:1 | 144 | 4¾ | 3.2 | do | Do. |
| 42b | Ricinoleic | 69.7 | 12a | 244 | 5 | 141 | 1:1 | 150 | 4¾ | 7.3 | do | Do. |
| 43b | Hydroxy decanoic | 44.0 | 12a | 244 | 5 | 139 | 1:1 | 151 | 3¾ | 4.2 | do | Do. |
| 44b | Ricinoleic | 55.5 | 8a | 200 | 5 | 144 | 1:1 | 144 | 6½ | 4.0 | do | Do. |
| 45b | Hydroxy decanoic | 35.0 | 8a | 200 | 5 | 145 | 1:1 | 146 | 6½ | 2.8 | do | Do. |
| 46b | Ricinoleic | 53.0 | 11a | 200 | 5 | 250 | 1:1 | 253 | 6½ | 3.0 | do | Do. |
| 47b | Hydroxy decanoic | 34.0 | 11a | 200 | 5 | 253 | 1:1 | 234 | 6½ | 2.0 | do | Do. |
| 48b | Hydroxy stearic | 99.2 | 7a | 228 | 5 | 160 | 1:1 | 156 | 4 | 7.0 | do | Do. |
| 49b | Hydroxy stearic | 79.0 | 9a | 200 | 5 | 175 | 1:1 | 149 | 4¾ | 6.8 | do | Do. |
| 50b | Hydroxy stearic | 71.8 | 12a | 244 | 5 | 173 | 1:1 | 153 | 5¼ | 6.3 | do | Do. |
| 51b | Hydroxy stearic | 57.0 | 8a | 200 | 5 | 152 | 1:1 | 148 | 6¼ | 3.3 | do | Do. |
| 52b | Hydroxy stearic | 55.0 | 11a | 200 | 5 | 247 | 1:1 | 239 | 6½ | 3.2 | do | Do. |
| 53b | P-nonyl cyclohexanol | 44.4 | 7a | 171 | 5 | 188.7 | 1:1 | 150 | 5½ | 4.4 | do | Very slight tendency to disperse. |
| 54b | Tetrahydrofurfuryl alcohol. | 26.6 | 7a | 228 | 5 | 219.0 | 1:1 | 146 | 5 | 5.2 | do | Do. |
| 55b | P-phenyl cyclohexanol | 45.9 | 7a | 228 | 5 | 2.4 | 1:1 | 149 | 6 | 5.6 | do | Do. |
| 56b | Nopol[2] | 43.3 | 7a | 228 | 5 | 155 | 1:1 | 158 | 4½ | 6.8 | do | Do. |
| 57b | Methylcyclohexanol | 62.1 | 7a | 228 | 5 | 151 | 1:1 | 159 | 4½ | 6.1 | do | Do. |
| 58b | P-octyl cyclohexanol | 55.4 | 7a | 228 | 5 | 150 | 1:1 | 158 | 4¾ | 6.0 | do | Do. |
| 59b | P-tertiary amylcyclohexanol. | 44.4 | 7a | 228 | 5 | 148 | 1:1 | 156 | 4¾ | 5.0 | do | Do. |
| 60b | P-sec.-butyl-cyclohexanol. | 40.8 | 7a | 228 | 5 | 142 | 1:1 | 156 | 4¾ | 5.0 | do | Do. |
| 61b | 2,4-diamylcyclohexanol | 62.8 | 7a | 228 | 5 | 153 | 1:1 | 159 | 4½ | 5.9 | do | Do. |
| 62b | Benzyl alcohol | 28.2 | 7a | 228 | 5 | 155 | 1:1 | 159 | 4½ | 7.0 | do | Do. |
| 63b | P-tert. amyl cyclohexanol. | 41.6 | 9a | 200 | 5 | 195 | 1:1 | 146 | 5¼ | 7.2 | do | Do. |
| 64b | Menthylcyclohexanol | 58.3 | 9a | 200 | 5 | 183.5 | 1:1 | 150 | 6 | 6.6 | do | Do. |

[1] Example number is that of S. N. 137,293.
[2] (6,6-dimethyl-bicyclo-(1,1,3)-hept-2-ene-2 ethanol).

Other esters, useful as intermediates for the production of the products of the invention, are prepared from oxyalkylated derivatives of alkyl phenol-aldehyde resins by reaction with the carboxyl-containing phenol-aldehyde resins.

The alkyl phenol-aldehyde resins which are oxyalkylated to produce suitable acylation-susceptible compounds are prepared from phenols having a hydrocarbon substituent having from 4 to 14 carbon atoms in the 2,4,6 position and the aldehydes have 8 carbon atoms or less. These products are water-insoluble, xylene-soluble, fusible resins. A large number of them are described in our Patent 2,499,365 and their oxyalkylation to produce suitable acylation-susceptible products is also described in some detail in this patent. We refer specifically to Examples 1a, 3a, 5a, 7a and 8a of that patent for examples of suitable alkyl phenol-aldehyde resins, which on oxyalkylation give acylation-susceptible compounds suitable for the production of the intermediates here described.

In column 2 of the table the resins of column 2 designated by an arabic numeral followed by a lower case "a" are the products of the corresponding examples of Patent 2,499,365, while those designated by an arabic numeral followed by two lower case "b's" are partially oxyalkylated products identified under "Ex. No." in the first column of the table.

| Ex. No. | Derivative No. | Amt. Taken, Gms. (Solvent Free) | Solvent Present, Gms. (Xylene) | Sod. Methylate Added, Gms. | EtO Added, Gms. | Time (hrs.) | Temp. Max., °C. | Max. Pres., lbs. per sq. inch | Solubility in Water |
|---|---|---|---|---|---|---|---|---|---|
| 1bb | 1a | 1555 | 1445 | 45 | 425 | ½ | 150 | 60 | Insoluble. |
| 2bb | 1bb | 1167 | 848 |  | 1350 | ¼ | 188 | 95 | Emulsifiable. |
| 3bb | 2bb | 780 | 265 |  | 1050 | ½ | 170 | 80 | Water Soluble. |
| 4bb | 1a | 518 | 482 | 15 | 1425 | ½ | 183 | 100 | Emulsifiable. |
| 5bb | 1a | 415 | 385 | 15 | 1700 | ¾ | 180 | 120 | Water Soluble. |
| 6bb | 1a | 353 | 633 | 15 | 2409 | ½ | 194 | 100 | Do. |
| 7bb | 6bb | 768 | 177 |  | 800 | ¼ | 161 | 100 | Do. |
| 8bb | 1a | 223 | 396 | 15 | 1816 | ½ | 192 | 95 | Do. |
| 9bb | 1a | 214 | 382 |  | 2039 | ¾ | 171 | 90 | Do. |
| 10bb | 1a | 196 | 349 | 15 | 2650 | ¾ | 171 | 80 | Do. |
| 11bb | 1a | 205 | 367 | 15 | 2223 | ¾ | 170 | 95 | Do. |
| 12bb | 3a | 1575 | 1425 | 50 | 400 | ¼ | 150 | 80 | Insoluble. |
| 13bb | 12bb | 1510 | 1090 |  | 1225 | ½ | 158 | 80 | Emulsifiable. |
| 14bb | 13bb | 1787 | 713 |  | 975 | ¾ | 173 | 60 | Water Soluble. |
| 15bb | 14bb | 1490 | 384 |  | 550 | ¼ | 160 | 150 | Do. |
| 16bb | 15bb | 964 | 180 |  | 260 | ¼ | 150 | 100 | Do. |
| 17bb | 3a | 280 | 533 | 10 | 1742 | ½ | 171 | 95 | Do. |
| 18bb | 3a | 142 | 270 | 10 | 1778 | ½ | 150 | 90 | Do. |
| 19bb | 3a | 183 | 347 | 10 | 2445 | ½ | 205 | 100 | Do. |
| 20bb | 3a | 208 | 396 | 10 | 1571 | ½ | 160 | 75 | Do. |
| 21bb | 3a | 212 | 402 | 10 | 2126 | ½ | 171 | 100 | Do. |
| 22bb | 3a | 227 | 430 | 10 | 1993 | ½ | 194 | 95 | Do. |
| 23bb | 8a | 1580 | 1420 | 50 | 325 | ¼ | 150 | 50 | Insoluble. |
| 24bb | 23bb | 1490 | 1110 |  | 1000 | ½ | 171 | 100 | Emulsifiable. |
| 25bb | 24bb | 920 | 410 |  | 1390 | ¼ | 172 | 150 | Soluble. |
| 26bb | 8a | 736 | 664 | 25 | 1500 | ¼ | 190 | 120 | Do. |
| 27bb | 8a | 490 | 440 | 15 | 1480 | ½ | 160 | 150 | Do. |

The following examples illustrate and describe the oxyalkylated derivatives of such phenol-aldehyde resins:

*Example 1bb*

The reaction vessel employed was a stainless steel autoclave with the usual devices for heating, heat control, stirrer, inlet, outlet, etc., which are conventional in this type of apparatus. The capacity was about 2 gallons. The stirrer was operated at a speed of approximately 250 R. P. M. There were charged into the autoclave 1555 grams of a resin of the kind identified by Example 1a of Patent 2,499,365. This resin was dissolved in 1445 grams of solvent (xylene); 45 grams of sodium methylate were added. The autoclave was sealed, swept with nitrogen gas, and stirring started immediately and heat applied. The temperature was allowed to rise to approximately 145°–150° C. At this point the addition of ethylene oxide was started. It was added continuously at such speed that it was absorbed by the reaction as rapidly as added. The amount of ethylene oxide added was 425 grams. The time required to add this ethylene oxide was one-half hour. During this period of time the temperature was maintained at 145°–150° C., using cooling water through the inner coils when necessary and otherwise applying heat when necessary. The maximum pressure during the reaction was 60 pounds per square inch. The product obtained was water-insoluble.

This oxyalkylated product was further oxyalkylated in two successive steps, resulting in the production of, first, an emulsifiable product and, finally, of a readily water-dispersible or "soluble" product. This is shown in the first 3 lines of the following table.

The other examples recited in the table represent still further examples of the preparation of this oxyalkylated alkylphenol-aldehyde class of reactants. That application includes a total of some 68 such examples.

Having prepared hydroxylated reactants as just described in Examples 1bb–27bb above, the carboxyl-containing resinous materials are then reacted therewith to produce the acylation products which are intermediates useful for preparing products of this invention.

The acylation products obtained from such oxyalkylated alkylphenol-aldehyde resins by reaction with a carboxyl-containing aldehyde-resin are illustrated by the following table.

The column headed "Carboxylic reactant" shows by number the carboxyl-containing resin employed in each example, such resins being those described under the same number and letter designations application S. N. 137,293.

The polyhydric reactant designated "63bb" in the following table is the resin of Example 3c of Patent 2,499,365 oxyethylated with 1750 grams of ethylene oxide to 1760 grams of the resin with 2,000 grams of xylene as solvent, 40 grams of sodium methylate as catalyst, time one hour, maximum temperature 180° C., maximum pressure 100 lbs. per sq. in. It is water soluble.

The polyhydric reactant designated "64bb" in the following table is the resin of Example 8a of Patent 2,499,365 oxyethylated with 1800 grams of ethylene oxide to 1920 grams of resin with 2,000 grams of xylene as solvent, 46.5 grams of sodium methylate as catalyst, time 1¼ hours, maximum temperature 182° C., maximum pressure 105 lbs. per sq. in. It is soluble in water.

The polyhydric reactant designated "65bv" in the following table is a resin obtained following the procedure of Example 1a of Patent 2,499,365, from technically pure nonyl phenol 660 grams, formaldehyde 37% 243 grams, concentrated HCl 9 grams, monoalkyl ($C_{10}$–$C_{20}$, principally $C_{12}$–$C_{14}$) benzene monosulfonic acid sodium salt 2.5 grams, and xylene 300 grams, which resin was oxyethylated with 1825 grams of ethylene oxide to 1975 grams of resin, with 2,000 grams of xylene as solvent, 48 grams of sodium methylate as catalyst, time 1½ hours, maximum temperature 181.5° C., maximum pressure 103 lbs. per sq. in. It is water soluble.

| Ex. No. | Ex. No. Polyhydric Reactant | Amt. Used Gms. (Solvent Free) | Ex. No. Carboxylic Reactant | Amt. Used Gms. (Solvent Free) | Solvent (Xylene) Gms. | Catalyst (Paratoluene Sulfonic Acid) Gms. | Ratio COOH to OH | Temp., °C. | Time (Hrs.) | Water out |
|---|---|---|---|---|---|---|---|---|---|---|
| 65b | 63bb | 176 | 7a | 107 | 337 | 7 | 1:1 | 150 to 170 | 4 | Approx. theoretical |
| 66b | 63bb | 141 | 7a | 171 | 354 | 7 | 2:1 | 150 to 170 | 4 | Do. |
| 67b | 63bb | 70.4 | 7a | 128 | 359.6 | 7 | 3:1 | 150 to 170 | 4 | Do. |
| 68b | 63bb | 176 | 9a | 100 | 282 | 7 | 1:1 | 150 to 170 | 4 | Do. |
| 69b | 63bb | 141 | 9a | 159.6 | 295.4 | 7 | 2:1 | 150 to 170 | 4 | Do. |
| 70b | 63bb | 70.5 | 9a | 119.7 | 302.3 | 7 | 3:1 | 150 to 170 | 4 | Do. |
| 71b | 63bb | 156.5 | 12a | 113.5 | 312 | 7 | 1:1 | 150 to 170 | 4 | Do. |
| 72b | 63bb | 117 | 12a | 170.5 | 312.5 | 7 | 2:1 | 150 to 170 | 4 | Do. |
| 73b | 63bb | 70.5 | 12a | 153.5 | 262 | 7 | 3:1 | 150 to 170 | 4 | Do. |
| 74b | 63bb | 140.8 | 11a | 112.6 | 297.6 | 7 | 1:1 | 150 to 170 | 4 | Do. |
| 75b | 63bb | 108 | 11a | 173 | 309 | 7 | 2:1 | 150 to 170 | 4 | Do. |
| 76b | 63bb | 70.5 | 11a | 168.5 | 272 | 7 | 3:1 | 150 to 170 | 4 | Do. |
| 77b | 63bb | 156.5 | 8a | 119.5 | 311 | 7 | 1:1 | 150 to 170 | 4 | Do. |
| 78b | 63bb | 117 | 8a | 179.5 | 314.5 | 7 | 2:1 | 150 to 170 | 4 | Do. |
| 79b | 63bb | 70.5 | 8a | 161.5 | 261.8 | 7 | 3:1 | 150 to 170 | 4 | Do. |
| 80b | 64bb | 157.5 | 7a | 101 | 294.5 | 7 | 1.2:1 | 150 to 170 | 4 | Do. |
| 81b | 64bb | 131.5 | 7a | 171 | 328.5 | 7 | 2.4:1 | 150 to 170 | 4 | Do. |
| 82b | 64bb | 83 | 7a | 161.5 | 283.5 | 7 | 3.6:1 | 150 to 170 | 4 | Do. |
| 83b | 64bb | 197 | 9a | 100 | 320 | 7 | 1:1 | 150 to 170 | 4 | Do. |
| 84b | 64bb | 157.5 | 9a | 159.5 | 330 | 7 | 2:1 | 150 to 170 | 4 | Do. |
| 85b | 64bb | 105 | 9a | 160 | 343 | 7 | 3:1 | 150 to 170 | 4 | Do. |
| 86b | 64bb | 175 | 12a | 113.5 | 304.5 | 7 | 1:1 | 150 to 170 | 4 | Do. |
| 87b | 64bb | 131 | 12a | 203 | 328 | 7 | 2:1 | 150 to 170 | 4 | Do. |
| 88b | 64bb | 87.5 | 12a | 170.5 | 275 | 7 | 3:1 | 150 to 170 | 4 | Do. |
| 89b | 65bb | 181.5 | 7a | 95 | 285.5 | 7 | 1:1 | 150 to 170 | 4 | Do. |
| 90b | 65bb | 148.5 | 7a | 160 | 287 | 7 | 2:2 | 150 to 170 | 4 | Do. |
| 91b | 65bb | 109 | 7a | 171 | 270 | 7 | 3:1 | 150 to 170 | 4 | Do. |
| 92b | 65bb | 234 | 9a | 114 | 301 | 7 | 1:1 | 150 to 170 | 4 | Do. |
| 93b | 65bb | 163 | 9a | 159.5 | 247.5 | 7 | 2:1 | 150 to 170 | 4 | Do. |

Still another class of esters are the esters derived from polyhydric alcohols and the carboxyl-containing phenol-aldehyde resins.

Example 94b

The particular resin employed was the one described under the heading of Example 7a of application S. N. 137,293. The polyhydric alcohol employed was ethylene glycol. The amount of ethylene glycol used was 9.3, grams. The amount of carboxylic resin was 256 grams. The amount of para-toluene sulfonic acid was 5 grams. The amount of solvent (xylene) present was 292 grams. The reflux temperature varied from 150° C. to 170° C. The time of refluxing was 4 hours. The solvent-free product was clear, reddish amber, and soft to tacky in appearance.

The water evolved was separated in a phase-separating trap as previously described. In a large number of similar experiments we have taken particular pains to measure the amount of water evolved. This, however, is not particularly significant, especially where the amount of water formed is simply a fraction of a mole, that is, 3, 4, 5 or 6 cc. We have found the figure is not significant for a number of reasons: (a) sometimes some of the water tends to hang up in the apparatus; (b) sometimes the reactants employed, although not necessarily in the instant case, contain a trace of moisture or some other volatile substance which comes over with the water and the reading appears to be high; (c) sometimes some other reaction, such as etherification, takes place. In this case the reaction was conducted until apparently no more water due to an acylation reaction came over. We have indicated this amount of water as being approximately theoretical which is in accordance with results. The formation of the ester yields a product having different physical characteristics, for instance, a higher molecular weight. It yields a product having different chemical characteristics than the reaction mixture, for instance, a saponification number. Similarly, the acid value or hydroxyl value of the finished reaction mass is different from that of the unreacted initial mixture.

The following table illustrates and describes this and other ester intermediates.

| Ex. No. | Reactant for Combination with Carboxyl Group | Amt. of Reactant Employed, Grams | Carboxylic Resin [1] | Amt. of Resin, Grams | Amt. of Acid Catalyst (P.T.S.*), Grams | Amt. of Solvent (Xylene), Grams | Ratio of Carboxyl to Hydroxyl | Reflux Temp., °C. | Time, in hrs. | Appearance of Solvent Free Ester |
|---|---|---|---|---|---|---|---|---|---|---|
| 94b | Ethylene glycol | 9.3 | 7a | 256 | 5 | 292 | 2:1 | 150° C. to 170° C. | 4 | Clear, reddish amber soft to tacky. |
| 95b | Propylene glycol | 11.4 | 7a | 256 | 5 | 292 | 2:1 | 150° C. to 170° C. | 4 | Clear, reddish amber soft to semi-fluid. |
| 96b | Glycerol | 13.8 | 7a | 256 | 5 | 292 | 2:1 | 150° C. to 170° C. | 4 | Clear, reddish amber soft to semi-pliable. |
| 97b | do | 9.2 | 7a | 256 | 5 | 292 | 3:1 | 150° C. to 170° C. | 4 | Reddish, black, hard brittle. |
| 98b | Diglycerol | 44 | 7a | 211 | 5 | 259 | 1:1 | 150° C. to 170° C. | 4 | Reddish amber, semi-soft to pliable. |
| 99b | do | 22 | 7a | 213 | 5 | 261 | 2:1 | 150° C. to 170° C. | 4 | Reddish black, hard and brittle. |
| 100b | do | 17.6 | 7a | 257.4 | 5 | 294.6 | 3:1 | 150° C. to 170° C. | 4 | Reddish amber, hard and brittle. |
| 101b | Sorbitol | 54.6 | 7a | 268 | 5 | 299 | 1.04:1 | 150° C. to 170° C. | 4 | Do. |
| 102b | do | 27.3 | 7a | 266 | 5 | 300 | 2.08:1 | 150° C. to 170° C. | 4 | Do. |
| 103b | do | 18 | 7a | 256 | 5 | 292 | 3:1 | 150° C. to 170° C. | 4 | Do. |
| 104b | Tetramethylol cyclohexanol | 33 | 7a | 256 | 5 | 292 | 2:1 | 150° C. to 170° C. | 4 | Do. |
| 105b | Propylene glycol | 304 | 7a | 128 | 7 | 197 | 1:1 | 150° C. to 170° C. | 4 | Dk. amber slightly opaque; soft, fluid. |

[1] Example number is that of S. N. 137,293.
* Para toluene sulfonic acid.

Further examples of acylation products which are included among the intermediates are products of high molecular weight obtained in various ways as, for example, the oxyethylation or oxypropylation of heat-stable carbohydrates, including mannitan, sorbitol, etc. For example, sucrose can be treated with an alkylene oxide (ethylene oxide or propylene oxide) in a ratio of 100 moles of oxide for each initial hydroxyl radical. Thus the molecular weight of such polyhydric alcohols may vary from ethylene glycol (62) to compounds whose molecular weights are in the neighborhood of 25,000.

We prefer that the hydroxylated reactant, employed herein to esterify the carboxyl-containing phenol-aldehyde resin, have a molecular weight not exceeding 25,000.

Compounds Containing Nitrogen

These intermediates are those wherein the acylation-susceptible reactant contains nitrogen, and particularly nitrogen in connection with carbon and hydrogen, or carbon, hydrogen and oxygen, and are prepared by reaction with a nitrogen compound of specified character, as described below.

Nitrogen-containing compounds which are reactive towards the carboxyl group can be divided into various classes as to their structure. Reactivity towards a carboxyl radical generally means the presence in them of either an amino nitrogen atom or an alkanol radical or the equivalent, that is, hydrogen attached to oxygen. The inorganic nitrogen compounds include ammonia, hydrazine, etc. The organic nitrogen compounds include amines, such as primary, secondary and tertiary amines, polyamines as well as monoamines, amines containing alkanol radicals or the equivalent, and amines which contain both a reactive hydrogen atom attached to oxygen and one or more reactive hydrogen atoms attached to nitrogen. For purposes of convenience the nitrogen-containing compounds employable as reactants here are divided into the following classes:

*Class 1.*—Compounds containing only 1 nitrogen atom per molecule, with at least 1 reactive hydrogen atom attached hereto, but in the absence of reactive hydroxyl groups. Ammonia and hydrazine are examples of inorganic compounds of this class. Primary amines like ethylamine, isopropylamine, butylamine, amylamine, hexylamine, heptylamine, octylamine, decylamine, tetradecylamine, hexadecylamine, and octadecylamine are members of the class. High molal primary amines, like those sold by Armour & Company, Chicago, as "Armeens," usually with a figure designation showing the numbers of C atoms in the alkyl radical, e. g., "Armeen 10," "Armeen 12," "Armeen 16," etc., are included. So are secondary amines like diethylamine, dipropylamine, dibutylamine, diamylamine, dihexylamine, dioctylamine, etc. Also included are aniline, cyclohexylamine, bis-(dimethylbutyl)-amine, 1-3-dimethylbutylamine, 2-amyl-4-methyl pentane. Amides are also included in this class, but are commonly not attractive for use here because of the difficulty of securing satisfactory reaction to produce secondary amides. Other useful amines of this class will be suggested by the above-recited list.

*Class 2.*—Compounds containing only 1 nitrogen atom per molecule, but in which a hydroxyl group is the only reactive and functional group, as here employed. In this class are tertiary alkanolamines like diethylethanolamine, dimethylethanolamine, triethanolamine, diethylpropanolamine, methyldiethanolamine, ethyldipropanolamine, phenyldiethanolamine, etc. The products obtained by reacting such amines with alkylene oxides like ethylene oxide or propylene oxide are also useful, e. g., triethanolamine may be reacted with ethylene- or propylene oxide. Alkyl primary amines, particularly those in which the alkyl group originates in fatty materials and contains from about 10 to about 18 carbon atoms, may be treated with such alkylene oxides to produce useful nitrogen compounds of the generic formula, R—di(AlkO)$_n$H—N. Similarly, amides of the generic formula RCONH$_2$, may be oxyalkylated to produce compounds of the generic formula,

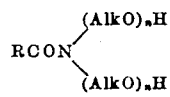

The ricinoleyl amides of dialkylamines are also examples of this class. Other examples of similarly useful reactants of this class will be suggested by the above list.

*Class 3.*—Compounds containing only 1 nitrogen atom per molecule and having, in addition to at least 1 reactive hydrogen atom attached thereto, also at least 1 reactive hydroxyl group. In this class are included monoethanolamine, diethanolamine, monopropanolamine, dipropanolamine, ethylethanolamine, propylethanolamine, ethylpropanolamine, phenylethanolamine, 2-amino-2-methyl-1-propanol, 4-amino-4-methyl-2-pentanol, 4-amino-2-butanol 1-dimethylamino-2-propanol, 5-isopropylamino-1-pentanol, etc. The high-molal monocarboxy acid amides of monoalkanolamines are also examples of this class. Obvious equivalents will be suggested by the above list.

*Class 4.*—Esters of tertiary alkanolamines having only 1 nitrogen atom per molecule, to which nitrogen atom there are attached no reactive hydrogen atoms, but in which ester molecule there is at least 1 reactive hydroxyl radical, either attached to the nitrogen atom through a suitable divalent radical or else as a part of the acyl radical present in said ester. The acyl radicals are those found in monocarboxy acids having 8 C atoms or more. Examples of this class of nitrogen compound are the esters produced from oleic acid and ethyldiethanolamine or from ricinoleic acid and diethylethanolamine. In the case of the above oleic ester, esterification consumes only one of the two hydroxyl groups originally present in that alkanolamine, leaving one such reactive hydroxyl group in the ester, for use for the present purpose. In the case of the ricinoleic ester above, esterification consumes the only hydroxyl group originally present in the alkanolamine there used; but the ricinoleic radical itself contains a reactive hydroxyl group, and the ester is therefore still reactive for the present purpose. In preparing the compounds of this kind, there may be employed only as many acyl radicals as there are alkanol radicals, less one; except that, if the acyl radical itself retains at least one reactive hydroxyl group after esterification, then one may use as many acyl radicals as there are alkanol radicals. Examples of suitable alkanolamines have already been recited under Class 2 above; but some of the examples there recited will not serve here in all cases because they contain only one reactive hydroxyl group and this is destroyed in esterification. If ricinoleic acid is the acylating reactant, all those recited there are useful here. It is apparent from the foregoing description that the intent is to retain at least one reactive hydroxyl group in the ester prepared from the tertiary alkanolamine and the acylating reactant employed.

Class 5.—Compounds which are non-resinous, which contain more than 1 nitrogen atom per molecule, and which contain no acyl group. Examples include the alkylene polyamines like ethylenediamine, diethylenetriamine, triethylenetetramine, tetraethylenepentamine, propylenediamine, dipropylenetriamine, etc. These alkylene polyamines may be treated with an alkylene oxide like ethylene oxide or propylene oxide to produce derivatives which are also useful here, such as hydroxyethylethylenediamine, tetraethanoltetraethylenepentamine, etc. Oxyalkylation may be continued, of course, until a considerable number of alkyleneoxy groups have been introduced, without adversely affecting the utility of such derivatives here. Imidazolines, both mono-imidazolines and di-imidazolines, are included in this present class. Such compounds may be prepared by reacting, under sufficiently severe conditions, a monocarboxylated acid and an alkylenepolyamine. For example, when oleic acid and tetraethylenepentamine are reacted in molar proportions at a temperature somewhat exceeding 200° C. amidification first occurs, with the elimination of 1 mole of water. On continued heating, especially at temperatures approaching 300° C., a second molecule of water is split out, the acyl group becomes an alkyl group, the imidazoline ring is formed, and the product is the monooleyl imidazoline of tetraethylenepentamine. If the proportion of fatty acid is doubled, a dioleyl imidazoline is produced, instead. Examples of such mono- and di-imidazolines are recited and described in U. S. Patent Nos. 2,466,517 and 2,468,163, dated April 5, 1949, and April 26, 1949, respectively, to Blair and Gross. Furthermore, U. S. Patent No. 2,369,818, dated February 20, 1945, to De Groote and Keiser, illustrates the fact that such imidazolines may be subjected to reaction with an alkylene oxide like ethylene oxide, to produce oxyalkylated derivatives thereof which are useful here.

Other examples of suitable reactants of the present class include 3-diethylaminopropylamine, 1-3-diaminobutane, triglycoldiamine, and the compound, $NH_2(CH_2)_3O(CH_2)_6O(CH_2)_3NH_2$. See also the co-pending case of one of us, Serial No. 107,381, filed July 28, 1949, for additional examples of suitable nitrogen compounds of this class.

Class 6.—Compounds containing more than 1 basic nitrogen atom per molecule, and which also contain at least one high molal acyl group. The amides produced from monocarboxy acids like the fatty acids and alkylene polyamines like tetraethylenepentamine, and referred to in Class 5 above as being intermediates formed in the preparation of certain imidazolines, are representative of this class. For example, if one reacts 1 mole of oleic acid with 1 mole of tetraethylenepentamine until 1 mole of water of reaction is removed, the product is an amide of the present class. Stearic acid or tall oil or other detergent-forming acid having at least 8 C atoms may be substituted for oleic acid in producing such an amide, with equally satisfactory results. Other alkylene polyamines such as ethylenediamine, diethylenetriamine, triethylenetetramine, etc., may be substituted for tetraethylenepentamine in the examples just discussed, to produce desirable amides. Or such polyamine may be oxyalkylated prior to use in the amidification reaction, using ethylene oxide or propylene oxide. If imidazolines of the kind included in Class 5, immediately above, are acylated, such acylated imidazolines are then properly included in the present class of nitrogen compounds. Other useful examples of nitrogen compounds of the present class are described in U. S. Patent No. 2,243,329, dated May 27, 1940, to DeGroote and Blair.

Of all the members of this sixth class of nitrogen compounds, we prefer to employ as reactants here a type of product which is related to the esters of Class 4 above. If, instead of using molal proportions of high molal monocarboxy acid having 8 carbon atoms of more and of tertiary alkanolamine, as in the preparation of materials of Class 4, above, one employs 2 or more moles of alkanolamine for every mole of monocarboxy acid, desirable reactants of the present class are formed. These may be termed acylated polyaminoalcohols. To describe more precisely this particular and preferred type of Class 6 nitrogen compound, the following statement is made:

The compounds are acylated derivatives of a basic polyaminoalcohol of the formula:

said acylated derivatives thereof being such that there is at least one occurrence of the radical RCO, which is the acyl radical of a monocarboxy detergent-forming acid having at least 8 and not more than 32 carbon atoms; the amino nitrogen atom is basic; R'' is a member of the class consisting of aminoalkanol radicals, and polyaminoalkanol radicals, in which polyaminoalkanol radicals the amino nitrogen atoms are united by divalent radicals selected from the class consisting of alkylene radicals, alkyleneoxyalkylene radicals, hydroxyalkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; $n$ is a small whole number varying from 1 to 10; and RCO is a substituent for a hydroxyl hydrogen atom.

In the foregoing formula, R' may, in some of its multiple occurrences in the molecule, represent the same alkylene radical or it may represent different alkylene radicals, so long as each R contains from 2 to 10 carbon atoms. For example, oxyethylated, oxypropylated triethanolamine would contain some R' radicals which are $C_2H_4$ radicals, and others which are $C_3H_7$ radicals.

Further description of this acylated polyaminoalcohol reactant will be found, for example, in U. S. Patent No. 2,470,829, dated May 24, 1949, to Monson. As a specific example of this preferred class of nitrogen compound, a passage from said Monson patent will be recited later below, in this application.

It is to be understood that isomeric forms of the nitrogenous compounds of all 6 classes above may be employed instead of the forms referred to above, without departing from the invention.

The acylation products which constitute the intermediates here described are prepared by reacting a member of the class of carboxyl-containing, xylene-soluble, water-insoluble, acid-catalyzed, low-stage, phenol-aldehyde resins with a member of one of the classes of nitrogen compounds just recited above. In the more specific embodiment of this part of our invention, or what might be called its sub-generic aspect, reaction is effected between a resin of such class and a member of one group in Class 6 of said classes of nitrogen compounds. Both aspects are considered below.

Although the reactions involved here may be ammonolysis, esterification, or amidification reactions, they all involve the introduction, into the nitrogen compound, of an organic acyl radical; hence the reactions are all properly termed acylation reactions, and the products are acylation products.

The following examples will illustrate this acylation reaction and preparation of such acylated intermediates.

For convenience, we have used a conventional two-piece laboratory resin pot. The cover part of the equipment had four openings: One for reflux condenser; one for stirring device; one for a separatory funnel or other means for adding reactants; and a thermometer well. In the manipulation employed, the separatory funnel insert for adding reactants was not used. The device was equipped with a combination reflux and water-tap apparatus so that the single piece of apparatus could be used as either a reflux condenser or a water trap, depending on the position of the three-way glass stopcock. This permitted convenient withdrawal of water from the water trap. The equipment, furthermore, permitted any setting of the valve without disconnecting the equipment. The resin pot was heated with a glass fiber electrical heater constructed to fit snugly around the resin pot. Such heaters, with regulators, are readily available.

The selected carboxyl-containing resin, either dissolved in xylene or with xylene added, was placed in the resin pot, along with the appropriate other reactant. In the event that the other reactant was non-basic, such as a hydroxylated amide, a small amount of catalyst, usually paratoluene sulfonic acid, was added. When the other reactant was basic, as in the case of triethanolamine, usually no catalyst was added. The mixture was refluxed and stirred during the entire procedure.

When the phase-separating trap showed that the amount of water separated was approximately that expected from the reaction, the operation was stopped. The intermediate so obtained was, of course, dissolved in xylene. The xylene was readily removable by vacuum distillation although for subsequent reaction with an alkylene oxide there is no objection to its presence. The following examples illustrate the process:

*Example 106b*

The carboxyl-containing resin of Example 7a of application S. N. 137,293, in which the ratio of amyl phenol to salicylic acid in the original reaction mass was 4:1, was mixed (228 grams) with 38.9 grams of commercial triethanolamine and 222 grams of xylene. In this mixture the ratio of COOH radical to amine was 1:1. A catalyst, para-toluene sulfonic acid (5 grams), was added and the mass was refluxed at appromixately 145° C., in a conventional glass laboratory resin pot assembly, just described. After approximately 7 hours, the theoretical volume of water had been collected and the operation was stopped. The product, which was a dark-brown, brittle solid, somewhat water-dispersible, was the ester of the carboxyl-containing resin.

In similar fashion, several carboxyl-containing resins of the kind above described were reacted with nitrogen compounds of the various classes just recited, to produce the desired acylation products or intermediates. These examples are not set out here in the detail accorded Example 106b above; but are condensed into the following table. It is to be understood that the procedure is in general that of Example 106b. Details of each of such preparations, including the nature of the resin and the nitrogen body employed, the amount of each, the amount of xylene present, the amount of catalyst (paratoluene sulfonic acid) employed, if any, the molal ratio of carboxyl radical, COOH, to nitrogen body, the temperature of the reaction mass during processing, the time of processing, the amount of water evolved, are all set out in the table. The product was in all cases a dark-brown, brittle solid. In all instances except in Example 125b, it was water-dispersible.

| Ex. No. | Resin of Ex. No.[1] | Amt. (g.) | Nitrogen Compound | Amt. (g.) | Xylene (g.) | Catalyst (g.) | Ratio, COOH: N Body | Temp., °C | Time, Hrs. | Water Out |
|---|---|---|---|---|---|---|---|---|---|---|
| 106b | 7a | 228 | Triethanolamine | 38.9 | 222 | 5 | 1:1 | 145 | 7 | Theory. |
| 107b | 7a | 228 | Diethanolamine | 27.4 | 222 | 5 | 1:1 | 147 | 7 | Do. |
| 108b | 7a | 228 | Dipropanolamine | 34.7 | 222 | 5 | 1:1 | 152 | 7 | Do. |
| 109b | 9a | 200 | Diethylenetriamine | 25.2 | 200 | | 1:1 | 145 | 7 | Do. |
| 110b | 9a | 200 | Armeen 10 | 45.3 | 200 | | 1:1 | 150 | 5 | Do. |
| 111b | 9a | 200 | Armeen 12d | 46.8 | 200 | | 1:1 | 150 | 6 | Do. |
| 112b | 9a | 200 | Armeen 16d | 61.7 | 200 | | 1:1 | 150 | 5 | Do. |
| 113b | 9a | 200 | Armeen HTD | 66.6 | 200 | | 1:1 | 150 | 5 | Do. |
| 114b | 9a | 200 | Armeen 18D | 67.6 | 200 | | 1:1 | 150 | 5 | Do. |
| 115b | 9a | 200 | Armeen CD (Coco) | 50.5 | 200 | | 1:1 | 150 | 5 | Do. |
| 116b | 9a | 200 | Isopropanolamine | 18.4 | 200 | | 1:1 | 145 | 5 | Do. |
| 117b | 9a | 200 | Hydroxyethyl-ethylenediamine | 25.5 | 200 | | 1:1 | 147 | 6 | Do. |
| 118b | 9a | 200 | Dipropylenetriamine | 32.1 | 200 | | 1:1 | 147 | 5 | Do. |
| 119b | 9a | 200 | 2-amino-2-methyl-1-propanol | 21.8 | 200 | | 1:1 | 149 | 5 | Do. |
| 120b | 9a | 200 | Diethanolamine | 25.8 | 200 | | 1:1 | 152 | 5 | Do. |
| 121b | 9a | 200 | Armeen TC | 107 | 200 | | 1:1 | 152 | 6 | Do. |
| 122b | 9a | 200 | Armeen 2HT | 128 | 200 | | 1:1 | 152 | 6 | Do. |
| 123b | 9a | 200 | Di-n-butylamine | 31.8 | 200 | | 1:1 | 147 | 6 | Do. |
| 124b | 9a | 200 | 2-amino-4-methyl-pentane | 24.7 | 200 | | 1:1 | 145 | 6 | Do. |
| 125b | 9a | 200 | n-Decylamine | 38.5 | 200 | | 1:1 | 145 | 5 | Do. |
| 126b | 7a | 428 | Dimethylethanolamine | 44.5 | 303 | | 1:1 | 150 | 8 | Do. |
| 127b | 9a | 450 | ...do... | 50 | 320 | | 1:1 | 150 | 8 | Do. |
| 128b | 9a | 269 | Diethylethanolamine | 39.5 | 291 | | 1:1 | 150 | 8 | Do. |
| 129b | 8a | 291 | ...do... | 30.2 | 178 | | 1:1 | 150 | 8 | Do. |
| 130b | 11a | 283 | ...do... | 30.8 | 286 | | 1:1 | 150 | 8 | Do. |

[1] Example number is that of S. N. 137,293.

Note: The "Armeens" are high molal primary amines prepared in most cases from fatty materials, and are supplied commercially by Armour & Co., Chicago. See their catalog entitled "Armeens" for further description of them.

Example 131b

One mole of tetraethylenepentamine was oxyalkylated with ethylene oxide until 7 moles thereof had been absorbed, using the conventional procedure described above. This operation consumed 20 minutes, at a temperature of 165° C. and maximum pressure of 70 p. s. i. This product was then esterified with 1 mole of ricinoleic acid, using no catalyst and continuing heating at 240–250° C., for 1.5 hours, distilling off 1 mole of water of esterification, in that time. This esterification product was then acylated by reacting it with a carboxyl-containing phenol-aldehyde resin, as follows: Use 177 grams of the just-prepared acylation product and 189 grams of the resin of Example 7a of application S. N. 137,293, plus 234 grams of xylene. No catalyst was required. The reaction mass was refluxed with stirring for a total of 8 hours, the temperature being 150° C., during which time a theoretical amount of water was distilled off. The xylene-free product was a dark-brown, brittle solid.

Example 132b

One-half mole of triethylenetetramine and 0.5 mol. of tall oil was reacted to produce an amide, the reaction being conducted over a time of 7 hours, with the temperature at 200° C. for 5.5 hours, and finally at 240° C. for 1.5 hours. A total of 9 ml. of water was distilled off and collected in this time. The amide so produced was reacted with the resin of Example 7a of application S. N. 137,293, using 140 grams of amide, 265 grams of resin, 288 grams xylene, no catalyst. The temperature was held at 150° for 8 hours of heating, stirring, and refluxing, the water of reaction being distilled off. The resulting acylation product was a dark-brown, brittle solid.

Example 133b

An amide was prepared from tall oil and tetraethylenepentamine, using 0.5 mol. of each reactant. After heating 2 hours at 240° C., about 10 ml. of water had distilled. The amide was acylated using the carboxyl-containing resin of Example 9a of application S. N. 137,293. To do this, use 132 grams of the amide just prepared, 214 grams of the carboxyl-containing resin, 373 grams xylene, no catalyst. The temperature was 150° C. during heating and stirring with refluxing, which proceeded over 8 hours' time. Water of reaction was distilled, leaving a xylene solution of the desired acylation product. Said product, in absence of the solvent, was a red-brown, brittle solid.

Example 134b

Prepare the mono-ester of tall oil and triethanolamine by heating 1 mole of each for 240–250° C. for 1.5 hours. Mix 125 grams of said ester, 219 grams of the carboxyl-containing phenolaldehyde resin of Example 9a of application S. N. 137,293, and 255 grams xylene in the conventional resin pot, adding no catalyst. Reflux with stirring, at 150° C., for 8 hours, distilling off the water of reaction. The resulting acylation product, xylene-free, is a red-brown, brittle solid.

Example 135b

Prepare the reaction product of ricinoleic acid and diethylethanolamine by employing molal proportions of these reactants, and heating at 240–250° C. for 1.5 hours. The resulting product still retains the OH group in the ricinoleic acid residue present. React this product with the carboxyl-containing phenol-aldehyde resin of Example 9a of application S. N. 137,293 by refluxing, with stirring, 117 grams of the amine product, 224 grams of the resin, 259 grams xylene, without a catalyst, for 8 hours, distilling off the water of reaction. The product, xylene-free, is a red-brown, brittle solid.

Example 136b

Prepare an oxyethylated product from triethanolamine by introducing 3 moles of ethylene oxide per mole of triethanolamine, in a conventional oxyalkylation procedure, already described, no catalyst being required. Time required was 15 minutes; maximum temperature, 150° C., maximum pressure 60 p. s. i. The oxyalkylated triethanolamine, 85.5 grams, is mixed with the carboxyl-containing phenol-aldehyde resin of Example 9a of application S. N. 137,293, 242 grams, and xylene, 272 grams, no catalyst being added. Stir and reflux at 150° C. for 8 hours, distilling off the water of reaction. The xylene-free product is a red-brown, brittle solid.

Example 137b

Oxypropylate triethanolamine, using 3.46 moles of propylene oxide per mole of triethanolamine, in the conventional oxyalkylation procedure described above, no catalyst being required. Time required was 8 hours, maximum temperature, 165° C., maximum pressure, 200 p. s. i. React 102 grams of this product with 253 grams of the carboxyl-containing phenol-aldehyde resin of Example 9a of application S. N. 137,293, in the presence of 265 grams xylene, but no catalyst. After 8 hours of stirring and refluxing at 150° C., distill off the water of reaction. The product, solvent-free, is a dark-brown, brittle solid.

Example 138b

Oxyalkylate 1 mole of triethanolamine, using 3.46 moles of propylene oxide as in Example 32b above, the reaction requiring 8 hours at a maximum temperature of 165° C. and a maximum pressure of 200 p. s. i., and subsequently introducing 2.97 moles ethylene oxide into said oxypropylated amine, in 30 minutes, maximum temperature 160° C., maximum pressure 170 p. s. i. Thereafter, react the oxyalkylated amine, 130 grams, with the carboxyl-containing phenol-aldehyde resin of Example 9a of application S. N. 137,293, 216 grams, xylene, 254 grams, but no catalyst. Stir and reflux 8 hours at 150° C., distilling off the water of reaction. The product, solvent-free, is a red-brown, brittle solid.

Example 139b

React 0.5 mole of stearic acid and 0.5 mole of tetraethylenepentamine for 4.75 hours at 240° C., recovering 9 ml. water in the operation. React 190 grams of the amino product with 426 grams of the carboxyl-containing phenol-aldehyde resin of Example 12a of application S. N. 137,293, adding 474 grams xylene, but no catalyst to the mixture. Stir and reflux 8 hours, distilling off the water of reaction. The solvent-free product is a dark-brown, brittle solid.

In preparing acylation product intermediates from a nitrogen body selected from Classes 1 to 6 above, and a carboxyl-containing phenol-aldehyde resin, we prefer to employ a nitrogen body selected from that sub-group of Class 6 which are acylated derivatives of basic polyaminoalcohols. This particular sub-group of nitrogen compounds which are included in the above-described Class 6 are esters of tertiary alkanolamines having more than 1 nitrogen atom per molecule. They have also at least 1 acyl group per molecule said acyl group being a higher molal group, having at least 8 C atoms. Their molecule contains at least 1 reactive hydroxyl radical, either attached to nitrogen through a suitable divalent radical or else as a part of the acyl radical. These nitrogen-containing esters are not to be confused with a closely allied group classified in Class 4 above; they differ in being poly-amino, in the present case, whereas said Class 4 compounds are all mono-amino.

The presently employed nitrogenous esters may most conveniently be produced by reaction between a detergent-forming mono-carboxy acid having from 8 to 32 carbon atoms, or its glyceride or other ester, and a tertiary alkanolamine. For example, oleic acid and triethanolamine react to produce a very desirable example of the present class of nitrogen body. In such reaction, there must be present at least 2 moles of the tertiary alkanolamine for acyl radical present, else the product is at least in part a mono-amine of Class 4, as above stated. Usually, the acyl-containing reactant used to prepare the present acylated polyaminoalcohol does not itself contain a hydroxyl group. In such cases, reaction must be effected between such non-hydroxylated-acyl-containing reactant and a tertiary alkanolamine containing at least 2 reactive hydroxyl groups; so that, after formation of the ester there will remain at least 1 reactive hydroxyl group to accomplish reaction with the carboxyl-containing resin and to produce the acylated intermediate from which our final oxyalkylated product is to be derived.

To illustrate this: If ethyldiethanolamine is etherized by heating to a temperature sufficiently high to drive off a mole of water from 2 moles of the amine, the resulting polyamine contains 2 reactive hydroxyl groups, the other two having been destroyed in the etherization process. If one of the remaining two hydroxyl groups is esterified with oleic acid, there remains in the final product one CH group suitable for combination with the COOH group of the carboxyl-containing resin reactant. Such an acylated polyaminoalcohol therefore qualifies here.

However, if etherization had been effected between one mole of ethyldiethanolamine and one mole of diethylethanolamine, two of the three OH groups originally present would have been consumed. The third OH group would be consumed in the esterification of the oleic acid; and there would have been no residual OH group or groups available for reaction with the carboxyl-containing resin reactant. In such case, use of ricinoleic acid instead of oleic acid would have resulted in an acceptable final polyamino product, since the acyl group of ricinoleic acid itself contains a reactive hydroxyl group and this would have been available for reaction of the acylated polyaminoalcohol with the carboxyl-containing resin.

Therefore, in preparing acylated polyaminoalcohols of the desired class, one must bear in mind that such product must in all cases retain at least one OH group capable of reacting with the COOH group of the carboxyl-containing resin. In other words, if the basic polyaminoalcohol, before acylation, be represented by the formula $$H(OR')_n N{<}^{R''}_{R''}$$

wherein R' is usually selected from the class of ethylene, propylene, butylene, hydroxypropylene, and hydroxybutylene radicals, and R'' is, in at least one instance, a nitrogen-containing radical, then at least one R'' radical must contain an OH group, so that there are present in said polyaminoalcohol, before its acylation, at least 2 reactive OH groups; and, after acylation, it will still retain at least one OH group. Different occurrences of R' in a single molecule may, of course, represent different alkylene radicals or they may represent the same alkylene radical.

Oxyalkylation of the alkylene polyamines, to introduce OH groups thereinto, produces polyaminoalcohols suitable for acylation here. As above stated, such oxyalkylated alkylene polyamines must contain a minimum of two OH groups before acylation with the high molal detergent-forming monocarboxy acid or equivalent, so that a minimum of one OH is found in the finally prepared acylated nitrogen body; unless said detergent-forming acid's acyl group itself contains one or more OH groups, as in the case of ricinoleic acid, hydroxy-stearic acid, di-hydroxystearic acid, etc.

The preparation of suitable acylated polyaminoalcohols in not novel with us here. It has been disclosed in numerous patents, including the following: U. S. Patents Nos. 2,324,488 and 2,324,490, both dated July 20, 1943, to DeGroote and Keiser; 2,259,704, dated October 21, 1941, to Monson and Anderson; 2,306,329, dated December 22, 1942, to DeGroote, Keiser and Blair.

Examples of the preparation of acylated polyaminoalcohols include the following:

One mole of ricinoleic acid is heated with 3 moles of triethanolamine at approximately 250° C. for 6 hours. The product is an acylated polyaminoalcohol.

One mole of castor oil is substituted for ricinoleic acid and 9 moles of triethanolamine are employed instead of 3, above. The product closely resembles that of the first example above.

Oleic acid may be substituted for ricinoleic acid or castor oil. Tall oil, which is principally a mixture of oleic and rosin acids, may be substituted for the fatty acids. Different proportions of triethanolamine may be used, so long as at least 2 moles of triethanolamine are present for every acyl radical present.

As a preferred procedure for preparing an acylated polyaminoalcohol for the present purpose, the following is given, substantially as it appears in U. S. Patent 2,470,829, dated May 24, 1949, to Monson:

A mixture of diamino and triamino materials is prepared, (by heating triethanolamine) which correspond essentially to the two following type forms:

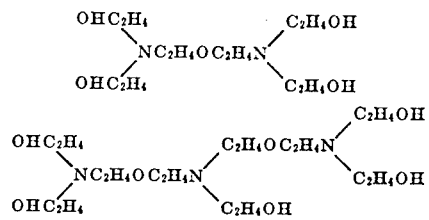

After determining the average molecular weight of such mixture, it is combined with castor oil in the proportion of 1 pound mole of castor oil for 3 pound moles of the mixed amines, "pound mole" in the latter case being calculated on the average molecular weight, as determined. Such mixture is heated to approximately 160–260° C.

for approximately 6 to 25 hours, until reaction is complete, as indicated by the disappearance of all of the triricinolein present in the castor oil.

Example 140b

Prepare a polyamino product from 925 grams of castor oil and 1090 grams triethanolamine, by heating at least 2 hours at a temperature of 250° C., and preferably 6 hours or even longer. The product contains approximately 2.5 triethanolamine residues per ricinoleic residue. Use 137 grams of it, 213 grams of the carboxyl-containing phenol-aldehyde resin of Example 19a of application S. N. 137,293, and 250 grams xylene, but no catalyst, to produce an acylation product of said amino material. Reaction is conducted by stirring with reflux for 8 hours at 150° C. and distilling off the water of reaction. The product is a dark-brown, brittle solid.

Example 141b

Produce a derivative of triethanolamine by reacting 885 grams soybean oil with 1090 grams triethanolamine for 6 hours at 250° C. React 137 grams of the product with 209 grams of the carboxyl-containing phenol-aldehyde resin of Example 20a of application S. N. 137,293, adding 254 grams xylene but no catalyst in the reaction. Reflux and stir 8 hours at 150° C., distilling off the water of reaction. The product, when solvent-free, is a dark-brown, brittle solid.

Example 142b

React 900 grams of tall oil with 2,180 grams of triethanolamine for 6 hours at 250° C. Thereafter mix 140 grams of this product with 112 grams of the carboxyl-containing phenol-aldehyde resin of Example 9a of application S. N. 137,293, and 348 grams xylene, but no catalyst. Reflux the mixture, with stirring, for 8 hours, distilling off the water of reaction. The product was not freed of solvent; but was used in xylene solution in the preparation of oxyalkylated derivatives, as noted below.

In the preparation of acylated intermediates from nitrogen-containing acylation-susceptible reactants and carboxyl-containing phenol-aldehyde resins we prefer that said nitrogenous acylation-susceptible reactants have a molecular weight not exceeding 25,000.

COMPOUNDS CONTAINING CHLORINE OR SULFUR

These intermediates are those in which a carboxyl-containing pheno-aldehyde resin is reacted with an organic acylation-susceptible reactant which contains chlorine or sulfur atoms or both in its molecule. In addition to carbon and hydrogen, oxygen or nitrogen, or both, may be present in such reactant.

Examples of chlorine-containing acylation-susceptible reactants usable here include chlorinated lower glycerides, like dichloromonostearin or dichlorodistearin, produced by the chlorination of oleic acid to form dichlorostearic acid, and the subsequent reaction thereof with an excess of glycerol. If desired, the dichlorostearic acid may be esterified in molar proportions with a polyhydric alcohol to produce a fractional ester containing chlorine; or such halogenated acid may be reacted with an alkylene oxide like ethylene oxide to produce such a fractional ester.

Cardanol is a substituted phenol derived from cashew nutshell oil, and contains an ethylenic side chain having 14 carbon atoms or more. It may be subjected to mild chlorination, to introduce chlorine into such unsaturated side chain. See U. S. Patent No. 2,368,709, dated February 6, 1945, to Harvey. To produce a suitable acylation-susceptible reactant from such chlorinated cardanol, one may subject it to oxyalkylation; or one may form a phenol-aldehyde resin from said chlorinated cardanol and an aldehyde like formaldehyde, and subsequently oxyalkylate said resin. Either oxyalkylated derivative is usable here. See our co-pending application, Serial No. 8,722, filed February 16, 1948, now Patent 2,499,365, granted March 7, 1950, where Example 258a relates to the production of a resin from cardanol and formaldehyde and Example 17b describes production of the oxyethylated derivative thereof. The same procedure may be employed to produce a similar resin from chlorinated cardanol and formaldehyde, and the oxyalkylated derivative thereof, respectively.

A chlorinated phenol, like para-chlorophenol, may be oxyalkylated to produce a chlorine-containing, acylation-susceptible product which is usable as a reactant here. If desired, p-chlorophenol, for example, may be converted into a resin by reaction with an aldehyde, and said chlorine-containing phenol-aldehyde resin may be oxyalkylated to produce a reactant suitable for the present purpose. See Example 203a of our co-pending application, Serial No. 8,722, filed February 16, 1948, for details for preparing such a resin.

Epichlorohydrin is a useful tool for introducing the chlorine atom into molecules which originally contain a reactive hydrogen atom or other reactive element capable of reacting with such epichlorohydrin. Such reactions are well-known and are not described here.

Where an alkylene oxide like ethylene oxide is employed to produce an acylation-susceptible derivative of a chlorine-containing material, it is often desirable to employ stannic chloride as a catalyst in the reaction, rather than the otherwise more commonly employed alkaline catalysts, like caustic soda. The reason is that such alkaline catalysts tend to de-chlorinate the halogenated reactant under the conditions which maintain during oxyalkylation, and this eliminates or destroys the catalyst.

Ethylene chlorohydrin and glycerin chlorohydrin are additional examples of usable chlorine-containing acylation-susceptible reactants.

Sulfur-containing acylation-susceptible materials include "Vultac," a line of resinous products of Sharples Chemicals, Inc., Philadelphia. This is the trade-mark of a number of sulfur-containing resinous materials, stated by the manufacturer to have the following generic structural formula:

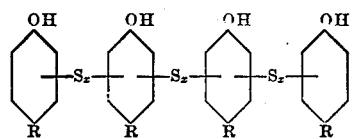

and to contain differing amounts of sulfur. These products, alkylphenol sulfides, may be reacted with alkylene oxides, like ethylene oxide, to produce acylation-susceptible derivatives which are useful here. If desired, they may be reacted with a suitable aldehyde, like formaldehyde, to form resins; and such resins may in turn be oxyalkylated as before, to produce acceptable acylation-susceptible derivatives. See Example 346a of our co-pending application, Serial No. 8,722, filed February 16, 1948, wherein Vultac resins are referred to; and to Example 64b of said co-pending application, wherein the oxyethylation of such Vultac resin is recited.

Santolite MS is the trademark of a sulfonamideformaldehyde resin manufactured by Monsanto Chemical Company, St. Louis. Such sulfur-containing material is referred to in Example 363a of our co-pending application, Serial No. 8,722, filed February 16, 1948; and its oxyethylation is described in Example 77b of said co-pending application. The oxyalkylated derivatives of said Santolite MS are usable acylation-susceptible reactants here. The Santolite MS, before oxyalkylation, is not particularly suitable for the present purpose, because of the relative inactivity of the —NH— group.

Other examples of acceptable sulfur-containing reactants of the present type are to be found in U. S. Patent No. 2,353,694, dated July 18, 1944, to De Groote and Keiser; and in U. S. Patent No. 2,345,121, dated March 28, 1944, to Hentrich and Kirstahler. Thiourea-formaldehyde resins may be oxyalkylated; and such oxyalkylated derivatives may be employed for the present purpose.

Sharples Chemicals, Inc., Philadelphia, also offers a polyethyleneglycol tertiary-dodecyl thioether under the trademark "Nonic 218" which is an acceptable sulfur-containing reactant of the present type, and which is made from dodecyl thioether by oxyethylation. Other oxyalkylated mercaptans immediately come to mind as obvious equivalents of such product, for the present use.

It is to be understood that the acylation-susceptible reactant may contain both sulfur and chlorine in its molecule, just as the reactant derived from Santolite MS above contains both sulfur and nitrogen. For example, one may employ, instead of the Sharples Vultac resin above, the chlorinated derivative thereof. Alternatively, one may prepare an oxyalkylated derivative of said Vultac resin, as in Example 146b just below; and then introduce chlorine into the molecule by reacting it with epichlorohydrin.

To produce, from a member of the foregoing class of chlorine- or sulfur-containing, acylation-susceptible reactants, an acylation product suitable for use as an intermediate in further reactions, it is only necessary to conduct a conventional reaction, such as an esterification reaction—or, in case the chlorine- or sulfur-containing reactant were without reactive hydroxyl groups, but were, for example, an amide or sulfonamide, an amidification reaction—between such reactant and a carboxyl-containing phenol-aldehyde resin. To illustrate such reactions, the following examples are given.

*Example 143b*

Oxyethylated p-chlorophenol is prepared by reacting the phenol, 128 grams, with ethylene oxide, 88 grams, in an autoclave of the kind fully described above, at a temperature of approximately 170° C., using 100 grams of xylene as a solvent, and 2 grams of stannic chloride to catalyze the reaction. Oxyethylation is readily achieved in a matter of minutes. The product, still in xylene solution, is removed from the autoclave, transferred to a glass resin pot, also adequately described above, and esterified with the carboxyl-containing resin of Example 7a of application S. N. 137,293. Esterification is achieved by stirring and refluxing 154 grams of the solution containing about 50 grams xylene and approximately 109 grams of oxyethylated phenol so prepared, 425 grams of the amylphenolsalicylic acid-formaldehyde resin of said Example 7a and 300 grams more of xylene for 4 hours in the presence of 2 grams para-toluene sulfonic acid, and distilling off water of esterification. Approximately the theoretical quantity, 0.5 mole, of water was so recovered. The product is a chlorine-containing acylation product or intermediate, usable for the preparation of oxyalkylated derivatives thereof for the present purpose.

*Example 144b*

Instead of oxyalkylating p-chlorophenol as in Example 143b just above, prepare a phenol-aldehyde resin from 128 grams of the phenol and 81 grams of 37% formaldehyde, employing the conventional resinification procedure described in detail in application Serial No. 137,293. Such resin, as prepared, contained 100 grams of xylene added before resinification; and also 1 or 2 grams of concentrated HCl and of alkylated aromatic sulfonic acid sodium salt employed to promote the resinification reaction. These are not removed from the mass before proceeding to the oxyethylation step. This is conducted by transferring to the autoclave, described above, approximately 137 grams of resin, 100 grams of xylene, 2 grams of resinification catalyst, plus 2 grams of stannic chloride (for oxyethylation catalyst). Ethylene oxide, 88 grams, is then introduced into this resin solution, maximum temperature being about 165° C., and absorption of the ethylene oxide being accomplished in 15 minutes. Approximately 225 grams of the oxyethylated chlorophenol-formaldehyde resin so prepared, in solution in 100 grams xylene, was added to 840 grams of the butylphenol-salicylic acid-formaldehyde resin of Example 9a of application S. N. 137,293, and 300 grams more xylene were added. The mixture was placed in a conventional glass resin pot, already described, and refluxed with stirring for 5 hours, in the presence of 3 grams p-toluene sulfonic acid. At the end of this time 18 grams of water of reaction, approximately theoretical in amount, had distilled off. The product was a chlorine-containing, acylation product intermediate.

*Example 145b*

Cardanol is chlorinated using the procedure recited in Example 5 of U. S. Patent No. 2,368,709, dated February 6, 1945, to Harvey, until approximately 2 moles of chlorine have been absorbed by each mole of cardanol. The chlorinated cardanol, 500 grams, was mixed with 113 grams 37% formaldehyde, 400 grams xylene, 3 grams concentrated HCl, and 1.5 grams alkylated aromatic sulfonic acid sodium salt, in a glass resin pot, and refluxed 3.5 hours, after which water of reaction was distilled off, the volume being about 25 ml. A portion of the xylene solution of the resin so formed, adjusted to contain 50% xylene solvent, was introduced into the autoclave already described, a total of 820 grams of such solution containing 410 grams of resin, being used; and 5 grams of stannic chloride were added as catalyst. Subsequently, ethylene oxide, 585 grams, was added in six portions, each of the first five being 90 grams, and the sixth, 135 grams. The additions were absorbed quite readily, the temperatures usually staying below about 160° C., and addition being achieved in a matter of about 30 minutes in each case. The product is a chlorine-containing acylation-susceptible reactant, usable here.

The oxyethylated resin, so produced from chlorinated cardanol-formaldehyde resin, was reacted with the carboxyl-containing phenol-aldehyde resin of Example 7a of application S. N. 137,293. Into a glass resin pot were introduced 350 grams of the cardanol derivative and 395 grams of the butylphenol-salicylic acid-formaldehyde resin, 7 grams p-toluene sulfonic acid, and 500 grams xylene. After stirring with reflux for 6 hours, water of reaction was distilled, its volume being about 18 ml. The product is a chlorine-containing acylation product.

*Example 146b*

Vultac resin, a product manufactured by Sharples Chemicals, Inc., Philadelphia, and consisting of an alkyl-phenol sulfide, as above described, 2,000 grams, was introduced into the autoclave previously described. To it were added 40 grams of sodium methylate and 2,000 grams xylene. Ethylene oxide, 4,000 grams, was introduced into the autoclave in four lots of 1,000 grams each. The time required for absorption of the first lot was 14 hours, at 160° C. The second lot was absorbed in the same time. The third lot was absorbed in 5 hours, at 162° C.; and the fourth lot was absorbed in 4 hours, at 150° C. The product was a sulfur-containing acylation-susceptible reactant, usable here.

It was reacted with the carboxyl-containing resin of Example 7a of application S. N. 137,293, using 400 grams of it and 500 grams of the carboxyl-containing resin in 300 grams xylene. The mixture was stirred and refluxed in a glass resin pot for 6 hours, in the presence of 3 grams paratoluene sulfonic acid, the water of reaction being distilled. About 7 grams of water were so recovered. The product is a sulfur-containing, acylation product, suitable for later use here.

*Example 147b*

Santolite MS, a sulfonamide-aldehyde resin manufactured by Monsanto Chemical Company, St. Louis, was oxyalkylated, as follows: Use Santolite MS, 500 grams; propylene oxide, 66 grams; sodium methylate, 1 gram. Introduce the two reactants and the catalyst into the autoclave previously described and heat for 2.3 hours at a temperature of about 150° C., the pressure reaching 95 p. s. i. No solvent is required here, since the resin is soluble in propylene oxide. Thereafter, approximately 762 grams of ethylene oxide were introduced in 12 portions, as follows: 44 grams in 4 hours, maximum temperature 150° C.; 57 grams, same conditions; 62 grams, 3 hours, 150° C. maximum; 62 grams, same conditions; 81 grams, same conditions; 71 grams plus 1 gram sodium methylate, 3.5 hours, 150° C. maximum; then six 65-gram portions, each requiring about 3 hours to add, with the maximum temperature ranging from about 145° C. to 150° C.

The oxyalkylated Santolite resin, which is a sulfur-containing acylation-susceptible material, was then reacted with the carboxyl-containing phenol-aldehyde resin of Example 9a of application S. N. 137,293. In this reaction, 1230 grams of of the oxyalkylated Santolite MS just prepared are mixed with 786 grams of the butylphenol-salicylic acid-formaldehyde resin of Example 9a above, 1,000 grams of xylene, and 20 grams of p-toluene sulfonic acid. The mixture was stirred under reflux for 8 hours, water of reaction being distilled. The product is the desired acylated intermediate.

In the preparation of acylated intermediates from sulfur- or chlorine-containing acylation-susceptible reactants and carboxyl-containing phenol-aldehyde resins we prefer that said acylation-susceptible reactants have a molecular weight not exceeding 25,000.

OXYALKYLATION

We have prepared intermediates of the kind described above on a scale varying from a few hundred grams or less in the laboratory, to hundreds of pounds on a plant scale. The same applies in the preparation of the oxyalkylated compounds with which this part of the specification is concerned. In preparing a large number of examples we have found it particularly advantageous to use laboratory equipment which permits continuous oxypropylation and oxyethylation. More specific reference will be made to treatment with glycide, subsequently in the text. The oxypropylation step is, of course, the same as the oxyethylation step insofar that two low boiling liquids are handled in each instance. What immediately follows refers to oxyethylation and it is understood that oxypropylation can be handled conveniently in exactly the same manner.

The oxyethylation procedure employed in the preparation of derivatives of the preceding intermediates has been uniformly the same, particularly in light of the fact that a continuous operating procedure was employed. In this particular procedure the autoclave was a conventional autoclave, made of stainless steel and having a capacity of approximately one gallon, and a working pressure of 1,000 pounds gauge pressure. The autoclave was equipped with the conventional devices and openings, such as the variable stirrer operating at speeds from 50 R. P. M. to 500 R. P. M., thermometer well and thermocouple for mechanical thermometer; emptying outlet; pressure gauge, manual vent line; charge hole for initial reactants; at least one connection for conducting the incoming alkylene oxide, such as ethylene oxide, to the bottom of the autoclave; along with suitable devices for both cooling and heating the autoclave, such as a cooling jacket and, preferably, coils in addition thereto, with the jacket so arranged that it is suitable for heating with steam or cooling with water, and further equipped with electrical heating devices. Such autoclaves are, of course, in essence small-scale replicas of the usual conventional autoclaves used in oxyalkylation procedures.

Continuous operation, or substantially continuous operation, is achieved by the use of a separate container to hold the alkylene oxide being employed, particularly ethylene oxide. The container consists essentially of a laboratory bomb having a capacity of about one-half gallon, or somewhat in excess thereof. This bomb was equipped, also, with an inlet for charging, and an outlet tube going to the bottom of the container so as to permit discharging of alkylene oxide in the liquid phase to the autoclave. Other conventional equipment consists, of course, of the rupture disc, pressure gauge, sight feed glass, thermometer connection for nitrogen for pressuring bomb, etc. The bomb was placed on a scale during use and the connection between the bomb and the autoclave were flexible stainless hose or tubing so that continuous weighings could be made without breaking or making any connections. This also applied to the nitrogen line, which was used to pressure the bomb reservoir. To the extent that it was required, any other usual conventional procedure or addition which provided greater safety was used, of course, such as safety glass, protective screens, etc.

With this particular arrangement practically all oxyethylations become uniform in that the reaction temperature could be held within a few degrees of any selected point in this particular range. In the early stages where the concentration of catalyst is high the temperature was generally set for around 150° C. or thereabouts. Subsequently temperatures up to 170° C. or higher may be required. It will be noted by examination of subsequent examples that this temperature range was satisfactory. In any case, where the reaction goes more slowly a higher temperature may be used, for instance, 165° C. to 180° C., and if need be 185° C. to 190° C. Incidentally, oxypropylation takes place more slowly than oxyethylation as a rule and for this reason we have used a temperature of approximately 160° C. to 165° C., as being particularly desirable for initial oxypropylation, and have stayed within the range of 165° C. to 185° C., almost invariably during oxypropylation. The ethylene oxide was forced in by means of nitrogen pressure as rapidly as it was absorbed as indicated by the pressure gauge on the autoclave. In case the reaction slowed up the temperature was raised so as to speed up the reaction somewhat by use of extreme heat. If need be, cooling water was employed to control the temperature.

As previously pointed out in the case of oxypropylation as differentiated from oxyethylation, there was a tendency for the reaction to slow up as the temperature dropped much below the selected point of reaction, for instance, 170° C. In this instance the technique employed was the same as before, that is, either cooling water was cut down or steam was employed, or the addition of propylene oxide speeded up, or electric heat used in addition to the steam in order that the reaction proceeded at, or near, the selected temperatures to be maintained.

Inversely, if the reaction proceeded too fast regardless of the particular alkylene oxide, the amount of reactant being added, such as ethylene oxide, was cut down or electrical heat was cut off, or steam was reduced, or if need be, cooling water was run through both the jacket and the cooling coil. All these operations, of course, are dependent on the required number of conventional gauges, check valves, etc., and the entire equipment, as has been pointed out, is conventional and, as far as we are aware, can be furnished by at least two firms who specialize in the manufacture of this kind of equipment.

Attention is directed to the fact that the use of glycide requires extreme caution. This is particularly true on any scale other than small laboratory or semi-pilot plant operations. Purely from the standpoint of safety in the handling of glycide, attention is directed to the following: (a) If prepared from glycerol monochlorohydrin, this product should be comparatively pure; (b) the glycide itself should be as pure as possible as the effect of impurities is difficult to evaluate; (c) the glycide should be introduced carefully and precaution should be taken that it reacts as promptly as introduced, i. e., that no excess of glycide is allowed to accumulate; (d) all necessary precaution should be taken that glycide cannot polymerize per se; (e) due to the high boiling point of glycide one can readily employ a typical separable glass resin pot as described in the copending application of Melvin De Groote and Bernhard Keiser, Serial No. 8,722, filed February 16, 1948, now Patent 2,499,365 and offered for sale by numerous laboratory supply houses. If such arrangement is used to prepare laboratory scale duplications, then care should be taken that the heating mantle can be removed rapidly so as to allow for cooling; or better still, through an added opening at the top the glass resin pot or comparable vessel should be equipped with a stainless steel cooling coil so that the pot can be cooled more rapidly than by mere removal of mantle. If a stainless steel coil is introduced it means that the conventional stirrer of the paddle type is changed into the centrifugal type which causes the fluid or reactants to mix due to swirling action in the center of the pot. Still better, is the use of a laboratory autoclave of the kind previously described, but in any event, when the initial amount of glycide is added to a suitable reactant, the speed of reaction should be controlled by the usual factors, such as (a) the addition of glycide; (b) the elimination of external heat, and (c) use of cooling coil so there is no undue rise in temperature. All the foregoing is merely conventional but is included due to the hazard in handling glycide.

*Example 1c*

The reaction vessel employed was a stainless steel autoclave with the usual devices for heating, heat control, stirrer, inlet, outlet, etc., which is conventional in this type of apparatus. The capacity was approximately 3½ liters. The stirrer operated at a speed of approximately 250 R. P. M. There were charged into the autoclave 257 grams of the intermediate derivative, Example 94b above (in which example ethylene glycol and the amyl-phenol-salicylic-acid-formaldehyde resin of Example 7a of application S. N. 137,293 were reacted to produce an ester which is the acylated product or intermediate employed in the present example), dissolved in 514 grams of solvent (xylene). 8 grams of sodium methylate were added. The autoclave was sealed, swept with nitrogen gas, stirring started immediately and the temperature allowed to rise to 152.5° C. At this point addition of ethylene oxide was started. It was added continuously at such speed that it was absorbed by the reaction as rapidly as added. The amount of ethylene oxide added was 254 grams. The time required to add the ethylene oxide was less than 10 minutes, as a matter of fact, only about 5 minutes were required. During this short reaction period the temperature rose rapidly to 180° C. The temperature was held at a maximum of 180° C., by using cooling water through the coils when required, or otherwise applying heat when needed. The maximum pressure during this short reaction period was 215 pounds. The product at the end of this reaction was somewhat emulsifiable but not clearly soluble.

The oxyethylation product produced as just described was subjected to further oxyethylation in the same manner, employing 326 grams of the solvent-free product of the first stage of oxyethylation, 326 grams of xylene solvent, no additional catalyst, and 173 grams more of ethylene oxide. In 5 minutes after introduction of the additional ethylene oxide, absorption thereof was substantially complete. The maximum temperature in this second stage of oxyalkylation was 170° C. and the maximum pressure observed was 180 p. s. i. The product was readily "water-soluble," i. e., readily water-dispersible.

Referring back to Example 1c just above, it will be noted that a total of 427 grams of ethylene oxide was employed in the two stages of the reaction there conducted. When glycide was substituted for ethylene oxide in the example, only 500 grams of glycide were employed in spite of its molecular weight (about two-thirds greater than that of ethylene oxide). The glycide was charged into the upper reservoir vessel which had been flushed out previously with nitrogen and was the equivalent of a separatory funnel. The amount of catalyst (sodium methylate) was reduced from 8 grams to 5 grams. The glycide was started slowly into the reaction mass in a dropwise stream. The reaction started to take place and the temperature rose approximately 12° to 18°. Cooling water was run through the coils so the temperature for the addition of glycide was controlled within the range roughly of 110° C. to 130° C. The addition was continuous within the limitations and all the glycide was added in less than 4¾ hours. This reaction took place at atmospheric pressure with simply a small stream of nitrogen passing into the autoclave at the very top and passing out through the open condenser so as to avoid any entrance of air. The final product was distinctly water-soluble.

The following table illustrates a number of other oxyalkylation derivatives of acylation or intermediate products described above all prepared in the manner outlined in Example 1c immediately preceding. The table identifies the products by example number, shows the amount of intermediate product used, the amount of solvent, the amount of catalyst, the amount of alkylene oxide, the time required, the maximum temperature and the maximum pressure and indicates whether the product is emulsifiable or soluble in water.

| Ex. No. | Derivative No. | Amt. Taken, Gms. (Solvent Free) | Solvent Present, Gms. (Xylene) | Sod. Methylate Added, Gms. | EtO Added, Gms. | Time (hrs.) | Temp. Max., °C. | Max. Pres., lbs. per sq. in. | Ratio EtO to Phenolic Hydroxyl | Solubility in Water |
|---|---|---|---|---|---|---|---|---|---|---|
| 1c | 2b | 365 | 365 | 5 | 32 | 2 | 170 | 80 | 2:1 | Not soluble. |
| 2c | 1c | 397 | 365 |  | 32 | 1 | 165 | 80 | 4:1 | Do. |
| 3c | 2c | 338 | 288 |  | 110 | ½ | 165 | 140 | 13:1 | Water soluble. |
| 4c | 3b | 244 | 126 | 5 | 92 | 2 | 170 | 150 | 2:1 | Not soluble. |
| 5c | 4c | 248.5 | 93.5 |  | 70 | 1 | 170 | 130 | 4:1 | Do. |
| 6c | 5c | 232 | 68 |  | 145 | ½ | 165 | 230 | 9.9:1 | Water soluble. |
| 7c | 6b | 261.5 | 261.5 |  | 95 | ¼ | 170 | 140 | 2:1 | Not soluble. |
| 8c | 7c | 254.5 | 186.5 |  | 75 | 1 | 165 | 110 | 4.3:1 | Do. |
| 9c | 8c | 187.5 | 137.5 |  | 145 | 1 | 175 | 230 | 8:1 | Water soluble. |
| 10c | 11b | 316 | 316 | 5 | 115 | ½ | 170 | 160 | 2:1 | Insoluble. |
| 11c | 10c | 312 | 228 |  | 60 | ¼ | 170 | 80 | 4:1 | Emulsifiable. |
| 12c | 11c | 218 | 134 |  | 120 | ¼ | 175 | 180 | 10.1:1 | Soluble. |
| 13c | 12b | 330 | 300 | 10 | 100 | ⅙ | 180 | 150 | 1.95:1 | Insoluble. |
| 14c | 13c | 430 | 300 |  | 105 | ⅙ | 185 | 160 | 4:1 | Emulsifiable. |
| 15c | 14c | 286 | 160 |  | 165 | ½₂ | 185 | 200 | 10.1:1 | Soluble. |
| 16c | 13b | 332 | 111 | 10 | 85 | ½₂ | 150 | 130 | 1.8:1 | Insoluble. |
| 17c | 16c | 326 | 86 |  | 50 | ½₂ | 150 | 130 | 3.2:1 | Emulsifiable. |
| 18c | 17c | 278 | 64 |  | 300 | ⅙ | 180 | 255 | 14:1 | (¹). |
| 19c | 20b | 405 | 171 | 10 | 110 | 1 | 170 | 85 | 2:1 | Not soluble. |
| 20c | 19c | 528 | 171 |  | 165 | 1¾ | 171 | 89 | 5:1 | Insoluble. |
| 21c | 20c | 693 | 171 |  | 235 | 1½ | 155 | 110 | 9:1 | Soluble. |
| 22c | 21c | 405 | 155 | 10 | 120 | ½ | 165 | 140 | 2:1 | Not soluble. |
| 23c | 22c | 535 | 155 |  | 160 | ¼ | 166 | 150 | 5:1 | Insoluble. |
| 24c | 23c | 695 | 155 |  | 225 | ¾ | 170 | 170 | 9:1 | Soluble. |
| 25c | 24c | 380 | 120 | 10 | 108 | ½ | 140 | 195 | 2:1 | Not soluble. |
| 26c | 25c | 498 | 120 |  | 165 | ½ | 155 | 156 | 5:1 | Insoluble. |
| 27c | 26c | 663 | 120 |  | 225 | ¼ | 172 | 210 | 9:1 | Soluble. |
| 28c | 25b | 212 | 289 | 8 | 125 | ¼ | 165 | 165 | 3:1 | Insoluble. |
| 29c | 28c | 219 | 189 |  | 85 | ¼ | 160 | 150 | 6:1 | Emulsifiable. |
| 30c | 29c | 183 | 113 |  | 80 | ⅙ | 170 | 150 | 10.9:1 | Soluble. |
| 31c | 26b | 190 | 262 | 6 | 110 | ½ | 165 | 170 | 2.7:1 | Insoluble. |
| 32c | 31c | 199 | 174 |  | 90 | ⅙ | 175 | 130 | 6.1:1 | Emulsifiable. |
| 33c | 32c | 211 | 128 |  | 75 | ½ | 170 | 120 | 10:1 | Soluble. |
| 34c | 27b | 206 | 262 | 8 | 105 | ¼ | 160 | 170 | 2.6:1 | Insoluble. |
| 35c | 34c | 210 | 178 |  | 95 | ½₂ | 170 | 140 | 6.1:1 | Emulsifiable. |
| 36c | 35c | 184 | 108 |  | 70 | ½₂ | 160 | 110 | 10.3:1 | Soluble. |
| 37c | 28b | 175 | 256 | 6 | 120 | ¼ | 175 | 170 | 3.16¼:1 | Insoluble. |
| 38c | 37c | 183 | 158 |  | 75 | ¼ | 165 | 135 | 6.2:1 | Emulsifiable. |
| 39c | 38c | 179 | 110 |  | 70 | ⅙ | 165 | 130 | 10.4:1 | Soluble. |
| 40c | 29b | 265 | 291 | 8 | 160 | ¼ | 170 | 185 | 3:1 | Insoluble. |
| 41c | 40c | 281 | 193 |  | 105 | ⅙ | 185 | 150 | 6:1 | Emulsifiable. |
| 42c | 41c | 267 | 133 |  | 105 | ⅙ | 170 | 150 | 10.3:1 | Soluble. |
| 43c | 30b | 236 | 266 | 8 | 195 | ⅙ | 190 | 210 | 3.12:1 | Emulsifiable. |
| 44c | 43c | 281 | 174 |  | 140 | ½₂ | 175 | 170 | 32:1 | Soluble. |
| 45c | 34b | 203 | 273 | 8 | 150 | ⅙ | 170 | 180 | 3:1 | Emulsifiable. |
| 46c | 45c | 239 | 185 |  | 110 | ½₂ | 160 | 150 | 6.32:1 | Soluble. |
| 47c | 35b | 237 | 252 | 8 | 155 | ⅙ | 175 | 180 | 3.2:1 | Emulsifiable. |
| 48c | 47c | 257 | 165 |  | 90 | ½₂ | 165 | 120 | 6:1 | Soluble. |
| 49c | 36b | 283 | 313 | 10 | 150 | ⅙ | 175 | 170 |  | Insoluble. |
| 50c | 49c | 309 | 224 |  | 110 | ½₂ | 170 | 150 |  | Emulsifiable. |
| 51c | 50c | 266 | 142 |  | 95 | ½₂ | 170 | 150 |  | Semi-rub., Water-Soluble. |
| 52c | 37b | 210 | 311 | 8 | 140 | ½ | 170 | 190 |  | Insoluble. |
| 53c | 52c | 225 | 324 |  | 100 | 1 | 165 | 160 |  | Emulsifiable. |
| 54c | 53c | 192 | 192 |  | 110 | ½₂ | 170 | 160 |  | Water-Soluble. |
| 55c | 38b | 252 | 253 | 10 | 210 | ⅙ | 190 | 250 |  | Insoluble. |
| 56c | 55c | 334 | 189 |  | 86 | ⅙ | 170 | 130 |  | Emulsifiable. |
| 57c | 56c | 286 | 129 |  | 109 | ½₂ | 170 | 170 |  | Water-Soluble. |
| 58c | 39b | 250 | 269 | 10 | 150 | ¼ | 180 | 190 |  | Insoluble. |
| 59c | 58c | 273 | 388 |  | 115 | ½ | 170 | 170 |  | Semi-rub., Emulsifiable. |
| 60c | 59c | 252 | 252 |  | 100 | ½₂ | 165 | 150 |  | Water-Soluble. |
| 61c | 40b | 225 | 225 | 8 | 170 | ½ | 165 | 180 |  | Insoluble. |
| 62c | 61c | 256 | 366 |  | 110 | ½₂ | 170 | 160 |  | Emulsifiable. |
| 63c | 62c | 185 | 185 |  | 110 | ½₂ | 170 | 160 |  | Water-Soluble. |
| 64c | 41b | 363 | 364 | 15 | 250 | ½₂ | 190 | 230 |  | Insoluble. |
| 65c | 64c | 422 | 260 |  | 156 | ½₂ | 180 | 200 |  | Emulsifiable. |
| 66c | 65c | 407 | 183 |  | 166 | ⅙ | 180 | 215 |  | Water-Soluble. |
| 67c | 42b | 229 | 335 | 8 | 110 | ½ | 165 | 150 |  | Insoluble. |
| 68c | 67c | 236 | 234 |  | 105 | ¼ | 170 | 130 |  | Semi-rub., Emulsifiable. |
| 69c | 68c | 242 | 242 |  | 85 | ⅙ | 160 | 110 |  | Water-Soluble. |
| 70c | 43b | 249 | 217 | 7 | 113 | ½₂ | 170 | 170 |  | Insoluble. |
| 71c | 70c | 247 | 153 |  | 115 | ½₂ | 170 | 170 |  | Do. |
| 72c | 71c | 202 | 85 |  | 71 | ½₂ | 170 | 140 |  | Water-Soluble. |

¹ Ratio 10:1. Not water-soluble. Very viscous but not rubbery. However, went to rubber at 14:1. EtO added in two portions.

| Ex. No. | Derivative No. | Amt. Taken, Gms. (Solvent Free) | Solvent Present, Gms. (Xylene) | Sod. Methylate Added, Gms. | EtO Added, Gms. | Time (hrs.) | Temp. Max., °C. | Max. Pres., lbs. per sq. in. | Ratio EtO to Phenolic Hydroxyl | Solubility in Water |
|---|---|---|---|---|---|---|---|---|---|---|
| 73c | 53b | 191 | 169 | 10 | 109 | ½ | 180 | 190 | | Insoluble. |
| 74c | 73c | 199 | 268 | | 96 | ½ | 180 | 180 | | Emulsifiable. |
| 75c | 74c | 184 | 158 | | 56 | ½ | 160 | 100 | | Water-Soluble. |
| 76c | 54b | 233 | 195 | 10 | 151 | ½ | 190 | 215 | | Insoluble. |
| 77c | 76c | 210 | 229 | | 111 | ½ | 180 | 180 | | Emulsifiable. |
| 78c | 77c | 205 | 133 | | 80 | ½ | 170 | 170 | | Water-Soluble. |
| 79c | 55b | 243 | 341 | 10 | 146 | ½ | 180 | 200 | | Insoluble. |
| 80c | 79c | 272 | 246 | | 104 | ½ | 170 | 180 | | Emulsifiable. |
| 81c | 80c | 252 | 166 | | 108 | ½ | 165 | 170 | | Water-Soluble. |
| 82c | 56b | 219 | 319 | 10 | 148 | ½ | 180 | 200 | | Insoluble. |
| 83c | 82c | 228 | 205 | | 85 | ½ | 170 | 160 | | Emulsifiable. |
| 84c | 83c | 198 | 131 | | 79 | ½ | 160 | 140 | | Water-Soluble. |
| 85c | 57b | 250 | 350 | 10 | 154 | ½ | 180 | 185 | | Insoluble. |
| 86c | 85c | 274 | 243 | | 103 | ½ | 170 | 180 | | Emulsifiable. |
| 87c | 86c | 230 | 148 | | 87 | ½ | 160 | 140 | | Water-Soluble. |
| 88c | 58b | 231 | 331 | 10 | 147 | ½ | 180 | 210 | | Insoluble. |
| 89c | 88c | 252 | 228 | | 95 | ½ | 170 | 145 | | Emulsifiable. |
| 90c | 89c | 185 | 121 | | 66 | ½ | 160 | 120 | | Water-Soluble. |
| 91c | 59b | 105 | 155 | 5 | 74 | ½ | 185 | 150 | | Insoluble. |
| 92c | 91c | 103.5 | 92.5 | | 37 | ¼ | 150 | 90 | | Emulsifiable. |
| 93c | 92c | 75.3 | 49.7 | | 31 | ¼ | 160 | 90 | | Water Soluble. |
| 94c | 60b | 225 | 325 | 10 | 147 | ½ | 180 | 200 | | Insoluble. |
| 95c | 94c | 257 | 232 | | 105 | ½ | 180 | 150 | | Emulsifiable. |
| 96c | 95c | 195 | 125 | | 75 | ½ | 160 | 125 | | Water Soluble. |
| 97c | 61b | 234 | 234 | 10 | 141 | ½ | 170 | 185 | | Insoluble. |
| 98c | 97c | 134 | 153 | | 83 | ½ | 150 | 150 | | Emulsifiable. |
| 99c | 98c | 200 | 96 | | 75 | ½ | 150 | 120 | | Water Soluble. |
| 100c | 62b | 202 | 202 | 10 | 140 | ½ | 170 | 200 | | Insoluble. |
| 101c | 100c | 191.5 | 118.5 | | 77 | ½ | 150 | 150 | | Emulsifiable. |
| 102c | 101c | 168 | 74 | | 67 | ½ | 150 | 150 | | Water Soluble. |
| 103c | 65b | 261 | 412 | 7 | 235 | ½ | 180 | 225 | | Emulsifiable. |
| 104c | 103c | 301 | 251 | | 188 | ½ | 185 | 200 | | Do. |
| 105c | 104c | 272 | 139 | | 45 | ¼ | 150 | 90 | | Soluble. |
| 106c | 66b | 288 | 426 | | 256 | ½ | 180 | 240 | | Emulsifiable. |
| 107c | 106c | 306 | 238 | | 200 | ½ | 190 | 220 | | Soluble. |
| 108c | 67b | 192 | 447 | | 192 | ½ | 200 | 240 | | Emulsifiable. |
| 109c | 108c | 174 | 203 | | 97 | ½ | 180 | 150 | | Do. |
| 110c | 109c | 160 | 120 | | 30 | ½ | 160 | 70 | | Soluble. |
| 111c | 68b | 262 | 368 | 7 | 262 | ½ | 190 | 200 | | Emulsifiable. |
| 112c | 111c | 305 | 214 | | 173 | ½ | 185 | 200 | | Soluble. |
| 113c | 69b | 280 | 384 | 8 | 265 | ¼ | 180 | 300 | | Emulsifiable. |
| 114c | 113c | 359 | 254 | | 192 | ½ | 180 | 220 | | Do. |
| 115c | 114c | 342 | 158 | | 57 | ½ | 160 | 120 | | Soluble. |
| 116c | 70b | 187 | 398 | 8 | 185 | ¼ | 180 | 250 | | Emulsifiable. |
| 117c | 116c | 224 | 240 | | 121 | ½ | 170 | 180 | | Do. |
| 118c | 117c | 218 | 151 | | 58 | ½ | 160 | 110 | | Soluble. |
| 119c | 71b | 256 | 396 | 8 | 255 | ¼ | 180 | 230 | | Emulsifiable. |
| 120c | 119c | 349 | 271 | | 180 | ½ | 170 | 200 | | Do. |
| 121c | 120c | 339 | 172 | | 60 | ½ | 160 | 100 | | Soluble. |
| 122c | 72b | 265 | 537 | 8 | 264 | ⅙ | 180 | 250 | | Emulsifiable. |
| 123c | 122c | 307 | 307 | | 160 | ½ | 180 | 200 | | Soluble. |
| 124c | 73b | 201 | 402 | 8 | 201 | ⅙ | 180 | 225 | | Emulsifiable. |
| 125c | 124c | 264 | 263 | | 132 | ½ | 170 | 200 | | Soluble. |
| 126c | 74b | 242 | 484 | 8 | 244 | ⅙ | 180 | 230 | | Emulsifiable. |
| 127c | 126c | 286 | 283 | | 149 | ½ | 160 | 200 | | Soluble. |
| 128c | 75b | 272 | 544 | 8 | 284 | ½ | 180 | 260 | | Emulsifiable. |
| 129c | 128c | 375 | 366 | | 177 | ½ | 180 | 180 | | Soluble. |
| 130c | 76b | 231 | 462 | 8 | 241 | ½ | 160 | 240 | | Emulsifiable. |
| 131c | 130c | 284 | 279 | | 131 | ½ | 180 | 200 | | Soluble. |
| 132c | 77b | 263 | 526 | 8 | 260 | ½ | 170 | 270 | | Emulsifiable. |
| 133c | 94b | 257 | 514 | 8 | 254 | ½ | 180 | 215 | | Emulsifiable. |
| 134c | 133c | 326 | 326 | | 173 | ½ | 170 | 180 | | Soluble. |
| 135c | 95b | 270 | 540 | 8 | 270 | ½ | 190 | 260 | | Emulsifiable. |
| 136c | 135c | 358 | 357 | | 179 | ½ | 170 | 190 | | Soluble. |
| 137c | 96b | 252 | 504 | 8 | 282 | ⅙ | 195 | 200 | | Emulsifiable. |
| 138c | 137c | 343 | 325 | | 155 | ¼ | 190 | 180 | | Soluble. |
| 139c | 97b | 255 | 510 | 8 | 275 | ⅙ | 190 | 200 | | Emulsifiable. |
| 140c | 139c | 313 | 301 | | 140 | ⅙ | 165 | 160 | | Soluble. |
| 141c | 98b | 271 | 542 | 8 | 281 | ⅙ | 195 | 240 | | Emulsifiable. |
| 142c | 141c | 289 | 282 | | 150 | ½ | 180 | 190 | | Do. |
| 143c | 142c | 251 | 162 | | 35 | ½ | 160 | 70 | | Soluble. |
| 144c | 99b | 222 | 444 | 8 | 314 | ½ | 200 | 240 | | Do. |
| 145c | 150b | 260 | 520 | 8 | 260 | ¼ | 190 | 245 | | Emulsifiable. |
| 146c | 145c | 320 | 320 | | 160 | ½ | 175 | 190 | | Soluble. |
| 147c | 101b | 298 | 596 | 8 | 298 | ¼ | 195 | 230 | | Emulsifiable. |
| 148c | 147c | 396 | 396 | | 198 | ½ | 170 | 210 | | Soluble. |
| 149c | 102b | 282 | 564 | 8 | 282 | ¼ | 195 | 230 | | Emulsifiable. |
| 150c | 149b | 364 | 364 | | 182 | ½ | 190 | 200 | | Soluble. |
| 151c | 103b | 252 | 504 | 8 | 265 | ¼ | 180 | 220 | | Emulsifiable. |
| 152c | 151c | 263 | 256 | | 147 | ⅙ | 180 | 200 | | Soluble. |
| 153c | 104b | 275 | 550 | 8 | 295 | ¼ | 180 | 225 | | Emulsifiable. |
| 154c | 153c | 316 | 304 | | 170 | ⅙ | 185 | 190 | | Soluble. |
| 155c | 105b | 419 | 838 | 9 | 419 | ¼ | 190 | 240 | | Emulsifiable. |
| 156c | 155c | 588 | 588 | | 299 | ¼ | 190 | 230 | | Do. |
| 157c | 156c | 582 | 388 | | 217 | ¼ | 175 | 190 | | (¹) |

¹ This product at this stage was emulsifiable but further oxyethylation did not seem particularly to increase solubility. For the present process the procedure was stopped at this particular point.

Example 158c

The reaction vessel employed was a stainless steel autoclave equipped with the usual devices for heating, heat control, stirrer, inlet, outlet, etc., which are conventional for this type of apparatus. The capacity was approximately 3.5 liters. The stirrer was operated at a speed of approximately 250 R. P. M. There was charged into this autoclave 216 grams of the acylated intermediate, prepared in Example 106b above, dissolved in 392 grams of xylene as solvent. Then 8 grams of sodium methylate catalyst were added. The autoclave was closed, then swept with nitrogen gas. Stirring was started and the temperature raised to about 150° C. At this point, addition of ethylene oxide was begun; and addition was thereafter continuous at such speed that absorption was substantially immediately achieved. The amount of ethylene oxide added was 216 grams, and the addition time was 0.5 hour. The maximum temperature during addition was 170° C., temperature being controlled by circulating cooling water through the autoclave jacket or applying steam for heating, as required. The maximum pressure observed during the reaction was 220 p. s. i. The oxyethylated product so obtained was emulsifiable in water in the presence of the xylene solvent.

Example 159c

The oxyethylated product of Example 158c above (234 grams) diluted with 235 grams of xylene solvent, was reacted with an additional 113 grams of ethylene oxide in the same manner as before, and without use of additional catalyst. In 10 minutes absorption of this amount of ethylene oxide was complete, the temperature having risen to a maximum of 180° C. and the pressure to a maximum of 220 p. s. i. The resulting oxyethylated product was readily "water-soluble" (really, "water dispersible"). It was not further reacted with the alkylene oxide.

Various other oxyalkylation procedures were employed on the acylated intermediates previously prepared, all in the manner just set out above. These are shown in the following table. In it, the nature of the acylation product or intermediate, the amount of it employed, the amount of xylene employed as solvent, of sodium methylate catalyst employed, if any, the amount of ethylene oxide used, the reaction time, maximum temperature and pressure observed, and dispersibility of the oxyethylated product in water, are all set forth.

| Ex. No. | Prod. of Ex. No. | Amt. (g.) | Xylene (g.) | Catalyst (g.) | EtO (g.) | Time, Hrs. | Max. Temp., °C. | Max. Press., p. s. i. | In Water |
|---|---|---|---|---|---|---|---|---|---|
| 158c | 106b | 216 | 392 | 8 | 216 | 0.5 | 170 | 220 | Emulsifiable. |
| 159c | 158c | 234 | 235 | -------- | 113 | 0.08 | 180 | 220 | Soluble. |
| 160c | 107b | 180 | 359 | 8 | 180 | 0.16 | 180 | 220 | Emulsifiable. |
| 161c | 160c | 164 | 165 | -------- | 82 | 0.08 | 170 | 150 | Soluble. |
| 162c | 108b | 198 | 396 | 8 | 212 | 0.08 | 180 | 250 | Emulsifiable. |
| 163c | 162c | 212 | 204 | -------- | 108 | 0.16 | 170 | 220 | Soluble. |
| 164c | 109b | 155 | 310 | 5 | 155 | 0.25 | 180 | 200 | Emulsifiable. |
| 165c | 164c | 161 | 161 | -------- | 86 | 0.16 | 160 | 150 | Soluble. |
| 166c | 110b | 175 | 307 | 5 | 190 | 0.25 | 180 | 200 | Emulsifiable. |
| 167c | 166c | 162 | 155 | -------- | 86 | 0.16 | 160 | 150 | Soluble. |
| 168c | 111b | 196 | 392 | 5 | 210 | 0.25 | 180 | 220 | Emulsifiable. |
| 169c | 168c | 204 | 197 | -------- | 107 | 0.16 | 160 | 150 | Soluble. |
| 170c | 112b | 207 | 414 | 5 | 211 | 0.25 | 180 | 220 | Emulsifiable. |
| 171c | 170c | 220 | 217 | -------- | 112 | 0.16 | 160 | 150 | Soluble. |
| 172c | 113b | 250 | 500 | 8 | 235 | 0.16 | 170 | 220 | Emulsifiable. |
| 173c | 172c | 259 | 266 | -------- | 160 | 0.08 | 180 | 200 | Soluble. |
| 174c | 114b | 229 | 458 | 8 | 215 | 0.16 | 175 | 220 | Emulsifiable. |
| 175c | 174c | 288 | 298 | -------- | 180 | 0.08 | 185 | 210 | Soluble. |
| 176c | 115b | 223 | 446 | 8 | 215 | 0.16 | 180 | 210 | Emulsifiable. |
| 177c | 176c | 295 | 300 | -------- | 165 | 0.08 | 185 | 190 | Soluble. |
| 178c | 116b | 196 | 392 | 8 | 205 | 0.08 | 180 | 210 | Emulsifiable. |
| 179c | 178c | 227 | 225 | -------- | 140 | 0.08 | 160 | 150 | Soluble. |
| 180c | 117b | 194 | 388 | 8 | 200 | 0.08 | 165 | 190 | Emulsifiable. |
| 181c | 180c | 215 | 212 | -------- | 140 | 0.08 | 160 | 170 | Soluble. |
| 182c | 118b | 202 | 404 | 8 | 200 | 0.08 | 165 | 195 | Emulsifiable. |
| 183c | 182c | 213 | 217 | -------- | 135 | 0.08 | 150 | 140 | Soluble. |
| 184c | 119b | 196 | 392 | 8 | 205 | 0.08 | 175 | 200 | Emulsifiable. |
| 185c | 184c | 231 | 225 | -------- | 130 | 0.08 | 160 | 160 | Soluble. |
| 186c | 120b | 208 | 416 | 8 | 208 | 0.25 | 175 | 195 | Emulsifiable. |
| 187c | 186c | 248 | 248 | -------- | 165 | 0.08 | 185 | 170 | Soluble. |
| 188c | 121b | 284 | 568 | 8 | 291 | 0.25 | 175 | 210 | Emulsifiable. |
| 189c | 188c | 336 | 333 | -------- | 175 | 0.08 | 185 | 190 | Do. |
| 190c | 189c | 333 | 217 | -------- | 60 | 0.08 | 160 | 110 | Soluble. |
| 191c | 122b | 304 | 608 | 9 | 304 | 0.25 | 190 | 230 | Emulsifiable. |
| 192c | 191c | 333 | 334 | -------- | 175 | 0.16 | 180 | 210 | Do. |
| 193c | 192c | 255 | 167 | -------- | 75 | 0.16 | 160 | 150 | Soluble. |
| 194c | 123b | 200 | 400 | 8 | 200 | 0.33 | 175 | 190 | Emulsifiable. |
| 195c | 194c | 226 | 226 | -------- | 145 | 0.16 | 175 | 185 | Soluble. |
| 196c | 124b | 188 | 376 | 8 | 188 | 0.08 | 165 | 210 | Emulsifiable. |
| 197c | 196c | 201 | 201 | -------- | 117 | 0.08 | 180 | 170 | Soluble. |
| 198c | 125b | 208 | 416 | 8 | 208 | 0.25 | 175 | 200 | Emulsifiable. |
| 199c | 198c | 282 | 282 | -------- | 160 | 0.16 | 175 | 185 | Soluble. |
| 200c | 126b | 436 | 872 | 10 | 436 | 0.33 | 170 | 210 | Emulsifiable. |
| 201c | 200c | 386 | 386 | -------- | 205 | 0.08 | 160 | 205 | Soluble. |
| 202c | 127b | 386 | 772 | 10 | 386 | 0.16 | 180 | 240 | Emulsifiable. |
| 203c | 202c | 407 | 407 | -------- | 215 | 0.08 | 170 | 200 | Do. |
| 204c | 203c | 326 | 213 | -------- | 215 | 0.33 | 170 | 200 | Soluble. |
| 205c | 128b | 286 | 572 | 9 | 286 | 0.08 | 175 | 200 | Emulsifiable. |
| 206c | 205c | 366 | 366 | -------- | 205 | 0.08 | 185 | 210 | Soluble. |
| 207c | 129b | 264 | 528 | 9 | 264 | 0.16 | 165 | 200 | Emulsifiable. |
| 208c | 207c | 271 | 271 | -------- | 145 | 0.08 | 175 | 190 | Soluble. |
| 209c | 130b | 179 | 358 | 7 | 189 | 0.16 | 170 | 200 | Emulsifiable. |
| 210c | 209c | 204 | 199 | -------- | 120 | 0.08 | 170 | 160 | Soluble. |
| 211c | 131b | 341 | 682 | 10 | 341 | 0.08 | 190 | 220 | Emulsifiable. |
| 212c | 211c | 319 | 319 | -------- | 170 | 0.08 | 185 | 200 | Do. |
| 213c | 212c | 253 | 166 | -------- | 135 | 0.08 | 170 | 190 | Soluble. |
| 214c | 132b | 269 | 538 | 9 | 269 | 0.25 | 180 | 190 | Emulsifiable. |
| 215c | 214c | 306 | 306 | -------- | 165 | 0.08 | 170 | 180 | Soluble. |
| 216c | 133b | 239 | 478 | -------- | 239 | 0.08 | 175 | 170 | Emulsifiable. |
| 217c | 216c | 275 | 275 | -------- | 155 | 0.08 | 175 | 180 | Soluble. |
| 218c | 134b | 318 | 636 | 10 | 340 | 0.08 | 195 | 210 | Emulsifiable. |
| 219c | 218c | 401 | 388 | -------- | 215 | 0.08 | 195 | 210 | Soluble. |
| 220c | 135b | 299 | 598 | 10 | 305 | 0.25 | 165 | 220 | Emulsifiable. |

| Ex. No. | Prod. of Ex. No. | Amt. (g.) | Xylene (g.) | Catalyst (g.) | EtO (g.) | Time, Hrs. | Max. Temp., °C. | Max. Press., p. s. i. | In Water |
|---|---|---|---|---|---|---|---|---|---|
| 221c | 220c | 376 | 371 | | 196 | 0.08 | 185 | 210 | Soluble. |
| 222c | 136b | 272 | 544 | 9 | 272 | 0.08 | 175 | 210 | Emulsifiable. |
| 223c | 222c | 308 | 308 | | 150 | 0.08 | 175 | 180 | Soluble. |
| 224c | 137b | 303 | 606 | 10 | 303 | 0.16 | 175 | 200 | Emulsifiable. |
| 225c | 224c | 368 | 368 | | 200 | 0.08 | 190 | 210 | Do. |
| 226c | 225c | 283 | 183 | | 237 | 0.16 | 160 | 180 | Soluble. |
| 227c | 138b | 321 | 642 | 10 | 334 | 0.16 | 195 | 210 | Emulsifiable. |
| 228c | 227c | 424 | 417 | | 220 | 0.08 | 190 | 220 | Do. |
| 229c | 228c | 368 | 220 | | 260 | 0.16 | 170 | 180 | Soluble. |
| 230c | 139b | 324 | 648 | 10 | 324 | 0.16 | 190 | 230 | Emulsifiable. |
| 231c | 230c | 362 | 362 | | ~0 | 0.08 | 185 | 190 | Soluble. |
| 232c | 140b | 334 | 668 | 10 | 348 | 0.16 | 190 | 220 | Emulsifiable. |
| 233c | 232c | 362 | 356 | | 196 | 0.08 | 180 | 190 | Soluble. |
| 234c | 141b | 327 | 654 | 10 | 340 | 0.16 | 195 | 210 | Emulsifiable. |
| 235c | 234c | 398 | 390 | | 209 | 0.08 | 190 | 220 | Soluble. |
| 236c | 142b | 213 | 426 | 8 | 213 | 0.08 | 195 | 210 | Emulsifiable. |
| 237c | 236c | 275 | 275 | | 150 | 0.08 | 180 | 180 | Soluble. |

Example 238c

The acylated intermediate prepared in Example 143b just above, from oxyethylated p-chlorophenol and amylphenol-salicylic acid-formaldehyde resin, 570 grams, was placed in the oxyalkylation autoclave, along with 500 grams xylene and 5 grams stannic chloride. Ethylene oxide was introduced continuously until a total of 1,300 grams had been absorbed. The maximum temperature noted during oxyethylation was 170° C. The operation required 7 hours. Samples taken from the autoclave showed progressively improved water-dispersibility, the final samples being quite water-dispersible.

Example 239c

The oxyethylated p-chlorophenol-formaldehyde resin - butylphenol - salicylic acid - formaldehyde resin acylation product prepared in Example 144b above was employed. Into the oxyalkylation autoclave were charged 535 grams of this material, 500 grams xylene, and 5 grams stannic chloride. Ethylene oxide was introduced continuously, controlling the temperature to below a maximum of 170° C. A total of 1,300 grams of ethylene oxide was so introduced in about 6 hours. The product exhibited increasing water-dispersibility as oxyethylation level was raised, the final product being quite water-dispersible.

Example 240c

Use the acylated intermediate of Example 145b above, 735 grams; xylene, 500 grams; stannic chloride, 7 grams. Place in the oxyalkylation autoclave, and introduce ethylene oxide continuously until a total of 440 grams has been absorbed. The time required is about 5 hours, the maximum temperature, above 165° C. Then, introduce a total of 116 grams propylene oxide into the mass, by disconnecting the ethylene oxide supply and attaching the propylene oxide supply. Absorption was somewhat slower, but was accomplished in 2 hours. Thereafter, introduce an additional 110 grams ethylene oxide, as before. The time required was about 0.5 hour. The final product showed water-dispersibility.

Example 241c

The acylated intermediate of Example 146b above was used, 500 grams. Into the autoclave were also introduced 500 grams xylene and 5 grams stannic chloride. Ethylene oxide, 440 grams, was then introduced in continuous fashion, as above. Absorption was complete in 7 hours, maximum temperature being 170° C. The final product was water-dispersible.

Example 242c

Use the acylated intermediate of Example 147b above, 500 grams; xylene, 500 grams; and stannic chloride, 5 grams. Introduce this mixture into the autoclave and then feed ethylene oxide continuously until a total of 550 grams have been absorbed. The time required was about 6 hours, and the maximum temperature attained was 175° C. The product was water-dispersible.

In addition to ethylene oxide, propylene oxide, glycide, or mixtures of the two, or all three of these oxides, one can use also methyl glycide and butylene oxide. Butylene oxide, if employed at all, should be used in combination with ethylene oxide, glycide or methyl glycide. The most desirable combination is, of course, one in which the oxyalkylated derivative shows marked surface-activity, which can be readily detected by an emulsification test as explained below.

The alpha-beta olefin oxides, employed to produce, from the acylated intermediates, oxyalkylated derivatives which are distinctly hydrophile in nature, as shown by the fact that they are self-emulsifiable or self-dispersible, miscible, or soluble in water, or have emulsifying properties, are characterized by the fact that they contain not over 8 carbon atoms and are selected from the class consisting of ethylene oxide, propylene oxide, butylene oxide, glycide, and methyl glycide. Glycide may, of course, be considered as a hydroxypropylene oxide and methyl glycide as a hydroxybutylene oxide. In any event, all such reactants contain the reactive ethylene oxide ring and may be best considered as derivatives of, or substituted, ethylene oxides. The solubilizing effect of the oxide is directly proportional to the percentage of oxygen present, or specifically, to the oxygencarbon ratio.

In ethylene oxide, the oxygen-carbon ratio is 1:2. In glycide, it is 2:3; and in methyl glycide, 1:2. In such compounds, the ratio is very favorable to the production of hydrophile or surface-active properties. However, the ratio, in propylene oxide, is 1:3, and in butylene oxide, 1:4. Obviously, such latter two reactants are satisfactorily employed only where the intermediate composition is such as to make incorporation of the desired property practical. In other cases, they may produce marginally satisfactory derivatives, or even unsatisfactory derivatives. They are usable in conjunction with the three more favorable alkylene oxides in all cases. For instance, after one or several propylene oxide or butylene oxide molecules have been attached to the acylation product molecule, oxyalkylation may be satisfactorily continued using the more favorable members of the class, to produce the desired hydrophile product. The reverse procedure may likewise be employed. Used alone, these two reagents may in some cases fail to produce sufficiently hydrophile derivatives because of their relatively low oxygen-carbon ratios.

Thus, ethylene oxide is more effective than propylene oxide, and propylene oxide is more effective than butylene oxide. Hydroxy-propylene oxide (glycide) is more effective than propylene oxide. Similarly, hydroxybutylene oxide (methyl glycide) is more effective than butylene oxide. Since ethylene oxide is the cheapest alkylene oxide available and is reactive, its use is definitely advantageous, and especially in light of its high oxygen content. Propylene oxide is less reactive than ethylene oxide, and butylene oxide is definitely less reactive than propylene oxide. On the other hand, glycide may react with almost explosive violence and must be handled with extreme care, as previously noted.

As has been previously pointed out, the oxyalkylation of intermediates of the kind from which the products used in practicing the process of the present invention are prepared is advantageously catalyzed by the presence of an alkali, except in certain cases, as where the product is chlorinated, in which case, to minimize dechlorination, a catalyst such as stannic chloride (see Examples 238c–242c) is advantageously used. Useful alkaline catalysts include soaps, sodium acetate, sodium hydroxide, sodium methylate, caustic potash, etc. The amount of alkaline catalyst usually is between 0.2% to 2%. The temperature employed may vary from room temperature to as high as 200° C. The reaction may be conducted with or without pressure, i. e., from zero pressure to approximately 200 or even 300 pounds gauge pressure (pounds per square inch). In a general way, the method employed is substantially the same procedure as used for oxyalkylation of other organic materials having reactive phenolic groups.

It may be necessary to allow for the acidity of an intermediate in determining the amount of alkaline catalyst to be added in its oxyalkylation. For instance, if a nonvolatile strong acid such as sulfuric acid is used to catalyze the resinification or intermediate reaction, presumably after being converted into a sulfonic acid, it may be necessary and is usually advantageous to add an amount of alkali equal stoichiometrically to such acidity, and include added alkali over and above this amount as the alkaline catalyst.

It is advantageous to conduct the oxyethylation of the intermediate in presence of an inert solvent such as xylene, cymene, decalin, ethyleneglycol diethylether, diethyleneglycol diethylether, or the like, although with many products, the oxyalkylation proceeds satisfactorily without a solvent. Since xylene is cheap and may be permitted to be present in the final product when used as a demulsifier, it is our preference to use xylene.

Considerable of what is said immediately hereinafter is concerned with the ability to vary the hydrophile properties of the compounds used in the process from minimum hydrophile properties to maximum hydrophile properties. Even more remarkable, and equally difficult to explain, are the versatility and utility of these compounds as one goes from minimum hydrophile property to ultimate maximum hydrophile property. For instance, minimum hydrophile property may be usually described roughly as the point where two ethyleneoxy radicals or moderately in excess thereof are introduced per phenolic hydroxyl. Such minimum hydrophile property or sub-surface-activity or minimum surface-activity means that the product shows at least emulsifying properties or self-dispersion in cold or even in warm distilled water (15° to 40° C.) in concentration of 0.5% to 5.0%. These materials are generally more soluble in cold water than warm water; and may even be very insoluble in boiling water. Moderately high temperatures aid in reducing the viscosity of the solute under examination. Sometimes if one continues to shake a hot solution, even though cloudy or containing an insoluble phase, one finds that solution takes place to give a homogeneous phase as the mixture cools. Such self-dispersion tests are conducted in the absence of an insoluble solvent.

When the hydrophile-hydrophobe balance is above the indicated minimum but insufficient to give a sol as described immediately preceding, then, in that event hydrophile properties are indicated by the fact that one can produce an emulsion by having present 10% to 50% of an inert solvent such as xylene. All that one need to do is to have a xylene solution within the range of 50 to 90 parts by weight of oxyalkylated derivatives and 50 to 10 parts by weight of xylene, mix such solution with one, two or three times its volume of distilled water, and shake vigorously so as to obtain an emulsion which may be of the oil-in-water type or the water-in-oil type (usually the former) but, in any event, is due to the hydrophile-hydrophobe balance of the oxyalkylated derivative. We prefer simply to use the xylene-diluted derivatives, which are described elsewhere, for this test rather than evaporate the solvent and employ any more elaborate tests, if the solubility is not sufficient to permit the simple sol test in water previously noted.

If the product is not readily water-soluble it may be dissolved in ethyl or methyl alcohol, ethyleneglycol diethylether, or diethyleneglycol diethylether, with a little acetone added if required, making a rather concentrated solution, for instance 40% to 50%, and then adding enough of the concentrated alcoholic or equivalent solution to give the previously suggested 0.5% to 5.0% strength solution. If the product is self-dispersing (i. e., if the oxyalkylated product is a liquid or a liquid solution self-emulsifiable), such sol or dispersion is referred to as at least semi-stable in the sense that sols, emulsions, or dispersions prepared are relatively stable, if they remain at least for some period of time, for instance 30 minutes to two hours, before showing any marked separation. Such tests are conducted at room temperature (22° C.). Needless to say, a test can be made in presence of an insoluble solvent such as 5% to 15% of xylene, as noted in previous examples. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage, and to form an emulsion in the lower and intermediate stages of oxyalkylation.

Allowance must be made for the presence of a solvent in the final product in relation to the hydrophile properties of the final product. The principle involved in the manufacture of the herein contemplated compounds for use as demulsifying agents or for other uses, is based on the conversion of a hydrophobe or non-hydrophile compound or mixture of compounds into products which are distinctly hydrophile, at least to the extent that they have emulsifying properties or are self-emulsifying; that is, when shaken with water they produce stable or semi-stable suspensions, or, in the presence of a water-insoluble solvent, such as xylene, an emulsion. In demulsification, it is sometimes preferable to use a product having markedly enhanced hydrophile properties over and above the initial stage of self-emulsifiability, although we have found that with products of the type used herein, most efficacious results are obtained with products which do not have hydrophile properties beyond the stage of self-dispersibility.

More highly oxyalkylated acylated products give colloidal solutions or sols which show typical properties comparable to ordinary surface-active agents. Such conventional surface-activity may be measured by determining the surface tension and the interfacial tension against paraffin oil or the like. At the initial and lower stages of oxyalkylation, surface-activity is not suitable determined in this same manner but one may employ an emulsification test. Emulsions come into existence as a rule through the presence of a surface-active emulsifying agent. Some surface-active emulsifying agents such as mahogany soap may produce a water-in-oil emulsion or an oil-in-water emulsion depending upon the ratio of the two phases, degree of agitation, concentration of emulsifying agent, etc.

The same is true in regard to the oxyalkylated products herein specified, particularly in the lower stage of oxyalkylation, the so-called "sub-surface-active" stage. The surface-active properties are readily demonstrated by producing a xylene-water emulsion. A suitable procedure is as follows: The oxyalkylated product is dissolved in an equal weight of xylene. Such 50-50 solution is then mixed with 1-3 volumes of water and shaken to produce an emulsion. The amount of xylene is invariably sufficient to reduce even a tacky, resinous product to a solution which is readily water-dispersible. The emulsions so produced are usually xylene-in-water emulsions (oil-in-water type), particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butylphenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such oxyalkylated resin, when diluted with an equal weight of xylene, will serve to illustrate the above emulsification test.

In a few instances, the product may not be sufficient soluble in xylene alone but may require the addition of some ethyleneglycol diethylether as described elsewhere. It is understood that such mixture, or any other similar mixture, is considered the equivalent of xylene for the purpose of this test.

In many cases, there is no doubt as to the presence or absence of hydrophile or surface-active characteristics in the products used in accordance with this invention. They dissolve or disperse in water; and such dispersions foam readily. With borderline cases, i. e., those which show only incipient hydrophile or surface-active property (sub-surface-activity), tests for emulsifying properties or self-dispersibility are useful. The fact that a reagent is capable of producing a dispersion in water is proof that it is distinctly hydrophile. In doubtful cases, comparison can be made with the butylphenol-formaldehyde resin derivative wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is readily immaterial whether a xylene solution produces a sol or whether it merely produces an emulsion.

In light of what has been said previously in regard to the variation of range of hydrophile properties, and also in light of what has been said as to the variation in the effectiveness of various alkylene oxides, and most particularly of all ethylene oxide, to introduce hydrophile character, it becomes obvious that there is a wide variation in the amount of alkylene oxide employed for producing products useful for the practice of this invention. Another variation is the molecular size of the resin intermediate chain as is well understood.

The products of the present application are useful, not only as demulsifying agents, but for other purposes where surface active materials are of value, as, for example, producing emulsions, detergents, agricultural sprays, further reaction with chemical compounds reactive toward hydroxyl radicals, etc.

The process of breaking petroleum emulsions of the water in oil type using these new products is described and claimed in our application Serial No. 145,579, filed February 21, 1950, of which the present application is a division. The intermediate acylation products, which are oxyalkylated to produce the products of the present invention, are described and claimed in our application Serial No. 182,166, filed August 30, 1950.

Having thus described our invention, what we claim as new and desire to secure by Letters Patent, is:

1. Hydrophile synthetic products, said hydrophile synthetic products being oxyalkylation products of the acylation product obtained by reacting (A) a fusible carboxyl - containing, xylene-soluble, water-insoluble, low stage phenol-aldehyde resin; said resin being derived by reaction between a mixture of a difunctional monohydric hydrocarbon-substituted phenol and salicylic acid on the one hand, and an aldehyde having not over 8 carbon atoms and one functional group reactive toward both components of the mixture on the other hand; the amount of salicylic acid employed in relation to the non-carboxylated phenol being sufficient to contribute at least one salicylic acid radical per resin molecule and the amount of non-carboxylated phenol being sufficient to contribute at least one non-carboxylated phenol radical per resin molecule; said resin being formed in the substantial absence of phenols of functionality greater than two and said phenol being of the formula

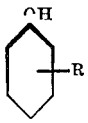

in which R is a hydrocarbon radical having at least 4 and not more than 14 carbon atoms and substituted in one of the positions ortho and para; with (B) an acylation-susceptible reactant composed exclusively of elements selected from the class consisting of carbon, hydrogen, oxygen, nitrogen, sulfur and chlorine, the molecular weight of said reactant not exceeding 25,000, said acylation product being characterized by linkage of said acylation-susceptible reactant to said resin at carboxy groups by reaction at radicals of said acylation-susceptible reactant of the class consisting of carbon-linked hydroxyl groups and nitrogen atoms; said oxyalkylated acylation product being characterized by introduction into the acylation product molecule of a plurality of divalent radicals having the formula $(R_1O)_n$, in which $R_1$ is a member selected from the class consisting of ethylene radicals, propylene radicals, butylene radicals, hydroxy propylene radicals and hydroxy butylene radicals, and $n$ is a numeral varying from 1 to 20; with the final proviso that the hydrophile properties of said oxyalkylated acylation product in an equal weight of xylene are sufficient to produce an emulsion when said xylene solution is shaken vigorously with 1 to 3 volumes of water.

2. Hydrophile synthetic products, said hydrophile synthetic products being oxyalkylation products of the acylation product obtained by reacting (A) a fusible carboxyl-containing, xylene-soluble, water-insoluble, low stage phenol-aldehyde resin; said resin being derived by reaction between a mixture of a difunctional monohydric hydrocarbon-substituted phenol and salicylic acid on the one hand, and an aldehyde having not over 8 carbon atoms and one functional group reactive toward both components of the mixture on the other hand; the amount of salicylic acid employed in relation to the non-carboxylated phenol being sufficient to contribute at least one salicylic acid radical per resin molecule and the amount of non-carboxylated phenol being sufficient to contribute at least one non-carboxylated phenol radical per resin molecule; said resin being formed in the substantial absence of phenols of functionality greater than two and said phenol being of the formula

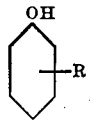

in which R is a hydrocarbon radical having at least 4 and not more than 14 carbon atoms and substituted in one of the positions ortho and para; with (B) an acylation-susceptible reactant composed of carbon, hydrogen, and oxygen, the molecular weight of said reactant not exceeding 25,000, said acylation product being characterized by linkage of said acylation-susceptible reactant to said resin at carboxy groups by reaction at carbon-linked hydroxyl groups; said oxyalkylated acylation product being characterized by introduction into the acylation product molecule of a plurality of divalent radicals having the formula $(R_1O)_n$, in which $R_1$ is a member selected from the class consisting of ethylene radicals, propylene radicals, butylene radicals, hydroxy propylene radicals and hydroxy butylene radicals, and $n$ is a numeral varying from 1 to 20; with the final proviso that the hydrophile properties of said oxyalklated acylation product in an equal weight of xylene are sufficient to produce an emulsion when said xylene solution is shaken vigorously with 1 to 3 volumes of water.

3. Hydrophile synthetic products, said hydrophile synthetic products being oxyalkylation products of the acylation product obtained by reacting (A) a fusible carboxyl-containing, xylene-soluble, water-insoluble, low stage phenol-aldehyde resin; said resin being derived by reaction between a mixture of a difunctional monohydric hydrocarbon-substituted phenol and salicylic acid on the one hand, and formaldehyde on the other hand; the amount of salicylic acid employed in relation to the non-carboxylated phenol being sufficient to contribute at least one salicyclic acid radical per resin molecule and the amount of non-carboxylated phenol being sufficient to contribute at least one non-carboxylated phenol radical per resin molecule; said resin being formed in the substantial absence of phenols of functionality greater than two and said phenol being of the formula

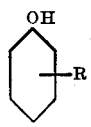

in which R is a hydrocarbon radical having at least 4 and not more than 14 carbon atoms and substituted in one of the positions ortho and para; with (B) an acylation-susceptible reactant composed of carbon, hydrogen, and oxygen, the molecular weight of said reactant not exceeding 25,000, said acylation product being characterized by linkage of said acylation-susceptible reactant to said resin at carboxy groups by reaction at carbon-linked hydroxyl groups; said oxyalkylated acylation product being characterized by introduction into the acylation product molecule of a plurality of divalent radicals having the formula $(R_1O)_n$, in which $R_1$ is a member selected from the class consisting of ethylene radicals, propylene radicals, butylene radicals, hydroxy propylene radicals and hydroxy butylene radicals, and $n$ is a numeral varying from 1 to 20; with the final proviso that the hydrophile properties of said oxyalkylated acylation product in an equal weight of xylene are sufficient to produce an emulsion when said xylene solution is shaken vigorously with 1 to 3 volumes of water.

4. Hydrophile synthetic products, said hydrophile synthetic products being oxyalkylation products of the acylation product obtained by reacting (A) a fusible carboxyl-containing, xylene-soluble, water-insoluble, low stage phenol-aldehyde resin; said resin being derived by reaction between a mixture of a difunctional monohydric hydrocarbon-substituted phenol and salicylic acid on the one hand, and formaldehyde on the other hand; the amount of salicylic acid employed in relation to the non-carboxylated phenol being in the range of 3 to 5 moles of phenol to 1 mole of salicylic acid; said resin being formed in the substantial absence of phenols of functionality greater than two and said phenol being of the formula

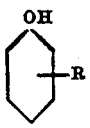

in which R is a hydrocarbon radical having at least 4 and not more than 14 carbon atoms and substituted in one of the positions ortho and para; with (B) an acylation-susceptible reactant composed of carbon, hydrogen, and oxygen, the molecular weight of said reactant not exceeding 25,000, said acylation product being characterized by linkage of said acylation-susceptible reactant to said resin at carboxy groups by reaction at carbon-linked hydroxyl groups; said oxyalkylated acylation product being characterized by introduction into the acylation product molecule of a plurality of divalent radicals having the formula $(R_1O)_n$, in which $R_1$ is a member selected from the class consisting of ethylene radicals, propylene radicals, butylene radicals, hydroxy propylene radicals and hydroxy butylene radicals, and $n$ is a numeral varying from 1 to 20; with the final proviso that the hydrophile properties of said oxyalkylated acylation product in an equal weight of xylene are sufficient to produce an emulsion when said xylene solution is shaken vigorously with 1 to 3 volumes of water.

5. Hydrophile synthetic products, said hydrophile synthetic products being oxyalkylation products of the acylation product obtained by reacting (A) a fusible carboxyl-containing, xylene-soluble, water-insoluble, low stage phenol-aldehyde resin; said resin being derived by reaction between a mixture of a difunctional monohydric hydrocarbon-substituted phenol and salicylic acid on the one hand, and formaldehyde on the other hand; the amount of salicylic acid employed in relation to the non-carboxylated phenol being in the range of 3 to 5 moles of phenol to 1 mole of salicylic acid; said resin being formed in the substantial absence of phenols of functionality greater than two and said phenol being of the formula

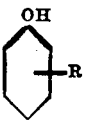

in which R is a hydrocarbon radical having at least 4 and not more than 14 carbon atoms and substituted in one of the positions ortho and para; with (B) an acylation-susceptible reactant which is an oxyalkylated, fusible, organic solvent-soluble, water-insoluble phenol-aldehyde resin; said resin being derived by reaction between a difunctional monohydric phenol and aldehyde having not over 8 carbon atoms and having one functional group reactive toward said phenol; said resin being formed in the substantial absence of phenols of functionality greater than two; said phenol being of the formula

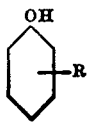

in which R is a hydrocarbon radical having at least 4 and not more than 14 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 50; with the proviso that at least one aliphatic hydroxyl radical be introduced for each resin nucleus, the molecular weight of said reactant not exceeding 25,000, said acylation product being characterized by linkage of said acylation-susceptible reactant to said resin at carboxy groups by reaction at carbon-linked hydroxyl groups; said oxyalkylated acylation product being characterized by introduction into the acylation product molecule of a plurality of divalent radicals having the formula $(R_1O)_n$, in which $R_1$ is a member selected from the class consisting of ethylene radicals, propylene radicals, butylene radicals, hydroxy propylene radicals, and hydroxy butylene radicals, and $n$ is a numeral varying from 1 to 20, with the final proviso that the hydrophile properties of said oxyalkylated acylation product in an equal weight of xylene are sufficient to produce an emulsion when said xylene solution is shaken vigorously with 1 to 3 volumes of water.

6. Hydrophile synthetic products, said hydrophile synthetic products being oxyalkylation products of the acylation product obtained by reacting (A) a fusible carboxyl-containing xylene-soluble, water-insoluble, low stage phenol-aldehyde resin; said resin being derived by reaction between a mixture of a di-functional monohydric hydrocarbon-substituted phenol and salicylic acid on the one hand, and formaldehyde on the other hand; the amount of salicylic acid employed in relation to the non-carboxylated phenol being in the ratio of 3 to 5 moles of phenol to 1 mole of salicylic acid; said resin being formed in the substantial absence of phenols of functionality greater than two and said phenol being of the formula

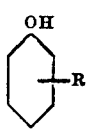

in which R is a hydrocarbon radical having at least 4 and not more than 14 carbon atoms and substituted in one of the positions ortho and para; with (B) hydroxylated water-insoluble esters of mono-carboxy acids composed of carbon, hydrogen and oxygen, said acylation product being characterized by linkage of said water insoluble hydroxylated esters to said resin at carboxy groups by reaction at carbon-linked hydroxyl groups; said oxyalkylated acylation product being characterized by introduction into the acylation product molecule of a plurality of divalent radicals having the formula $(R_1O)_n$, in which $R_1$ is a member selected from the class consisting of ethylene radicals, propylene radicals, butylene radicals, hydroxy propylene radicals and hydroxy butylene radicals, and $n$ is a numeral varying from 1 to 20, with the final proviso that the hydrophile properties of said oxyalkylated acylation product in an equal weight of xylene are sufficient to produce an emulsion when said xylene solution is shaken vigorously with 1 to 3 volumes of water.

7. Hydrophile synthetic products, said hydrophile synthetic products being oxyalkylation products of the acylation product obtained by reacting (A) a fusible carboxyl-containing xylene-soluble, water-insoluble, low stage phenolaldehyde resin; said resin being derived by reaction between a mixture of difunctional monohydric hydrocarbon-substituted phenol and salicylic acid on the one hand, and formaldehyde on the other hand; the amount of salicylic acid employed in relation to the non-carboxylated phenol being in the ratio of 3 to 5 moles of phenol to 1 mole of salicylic acid; said resin being formed in the substantial absence of phenols of functionality greater than two and said phenol being of the formula

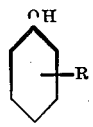

in which R is a hydrocarbon radical having at least 4 and not more than 14 carbon atoms and substituted in one of the positions ortho and para; with (B) a hydroxylated fractional ester of a detergent-forming monocarboxy acid having at least 8 and not more than 22 carbon atoms and a polyhydric alcohol, said ester being composed of carbon, hydrogen and oxygen, said acylation product being characterized by linkage of said fractional ester to said resin at carboxy groups by reaction at carbon-linked hydroxyl groups; said oxyalkylated acylation product being characterized by introduction into the acylation product molecule of a plurality of divalent radicals having the formula $(R_1O)_n$, in which $R_1$ is a member selected from the class consisting of ethylene radicals, propylene radicals, butylene radicals, hydroxy propylene radicals and hydroxy butylene radicals, and $n$ is a numeral varying from 1 to 20, with the final proviso that the hydrophile properties of said oxyalkylated acylation product in an equal weight of xylene are sufficient to produce an emulsion when said xylene solution is shaken vigorously with 1 to 3 volumes of water.

8. Hydrophile synthetic products, said hydrophile synthetic products being oxyalkylation products of the acylation product obtained by reacting (A) a fusible carboxyl-containing, xylene-soluble, water-insoluble, low stage phenolaldehyde resin; said resin being derived by reaction between a mixture of difunctional monohydric hydrocarbon-substituted phenol and salicylic acid on the one hand, and an aldehye having not over 8 carbon atoms and one functional group reactive toward both components of the mixture on the other hand; the amount of salicylic acid employed in relation to the non-carboxylated phenol being sufficient to contribute at least one salicylic acid radical per resin molecule and the amount of non-carboxylated phenol being sufficient to contribute at least one non-carboxylated phenol radical per resin molecule; said resin being formed in the substantial absence of phenols of functionality greater than two and said phenol being of the formula

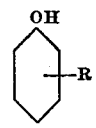

in which R is a hydrocarbon radical having at least 4 and not more than 14 carbon atoms and substituted in one of the positions ortho and para; with (B) an acylation-susceptible reactant composed of carbon, hydrogen, oxygen, and nitrogen, the molecular weight of said reactant not exceeding 25,000, said acylation product being characterized by linkage of said acylation-susceptible reactant to said resin at carboxy groups by reaction at radicals of said acylation-susceptible reactant of the class consisting of carbon-linked hydroxyl groups and nitrogen atoms; said oxyalkylated acylation product being characterized by introduction into the acylation product molecule of a plurality of divalent radicals having the formula $(R_1O)_n$, in which $R_1$ is a member selected from the class consisting of ethylene radicals, propylene radicals, butylene radicals, hydroxy propylene radicals and hydroxy butylene radicals, and $n$ is a numeral varying from 1 to 20, with the final proviso that the hydrophile properties of said oxyalkylated acylation product in an equal weight of xylene are sufficient to produce an emulsion when said xylene solution is shaken vigorously with 1 to 3 volumes of water.

9. Hydrophile synthetic products, said hydrophile synthetic products being oxyalkylation products of the acylation product obtained by reacting (A) a fusible carboxyl-containing, xylene-soluble, water-insoluble, low stage phenol-aldehyde resin; said resin being derived by reaction between a mixture of a difunctional monohydric hydrocarbon-substituted phenol and salicylic acid on the one hand, and formaldehyde on the other hand; the amount of salicylic acid employed in relation to the non-carboxylated phenol being sufficient to contribute at least one salicylic acid radical per resin molecule and the amount of non-carboxylated phenol being sufficient to contribute at least one non-carboxylated phenol radical per resin molecule; said resin being formed in the substantial absence of phenols of functionality greater than two and said phenol being of the formula

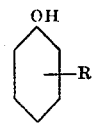

in which R is a hydrocarbon radical having at least 4 and not more than 14 carbon atoms and substituted in one of the positions ortho and para; with (B) an acylation-susceptible reactant composed of carbon, hydrogen, oxygen, and nitrogen, the molecular weight of said reactant not exceeding 25,000, said acylation product being characterized by linkage of said acylation-susceptible reactant to said resin at carboxy groups by reaction at a radical of said acylation-susceptible reactant of the class consisting of carbon-linked hydroxyl groups and nitrogen atoms; said oxyalkylated acylation product being characterized by introduction into the acylation product molecule of a plurality of divalent radicals having the formula $(R_1O)_n$, in which $R_1$ is a member selected from the class consisting of ethylene radicals, propylene radicals, butylene radicals, hydroxy propylene radicals and hydroxy butylene radicals, and $n$ is a numeral varying from 1 to 20, with the final proviso that the hydrophile properties of said oxyalkylated acylation product in an equal weight of xylene are sufficient to produce an emulsion when said xylene solution is shaken vigorously with 1 to 3 volumes of water.

10. Hydrophile synthetic products, said hydrophile synthetic products being oxyalkylation products of the acylation product obtained by reacting (A) a fusible carboxyl-containing, xylene-soluble, water-insoluble, low stage phenol-aldehyde resin; said resin being derived by reaction between a mixture of a difunctional monohydric hydrocarbon-substituted phenol and salicylic acid on the one hand, and formaldehyde on the other hand; the amount of salicylic acid employed in relation to the non-carboxylated phenol being in the range of 3 to 5 moles of phenol to 1 mole of salicylic acid; said resin being formed in the substantial absence of phenols of functionality greater than two and said phenol being of the formula

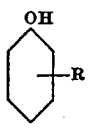

in which R is a hydrocarbon radical having at least 4 and not more than 14 carbon atoms and substituted in one of the positions ortho and para; with (B) an acylation-susceptible reactant composed of carbon, hydrogen, oxygen, and nitrogen, the molecular weight of said reactant not exceeding 25,000, said acylation product being characterized by linkage of said acylation-susceptible reactant to said resin at carboxy groups by reaction at a radical of said acylation-susceptible reactant of the class consisting of carbon-linked hydroxyl groups and nitrogen atoms; said oxyalkylated acylation product being characterized by introduction into the acylation product molecule of a plurality of divalent radicals having the formula $(R_1O)_n$, in which $R_1$ is a member selected from the class consisting of ethylene radicals, propylene radicals, butylene radicals, hydroxy propylene radicals and hydroxy butylene radicals, and $n$ is a numeral varying from 1 to 20, with the final proviso that the hydrophile properties of said oxyalkylated acylation product in an equal weight of xylene are sufficient to produce an emulsion when said xylene solution is shaken vigorously with 1 to 3 volumes of water.

11. Hydrophile synthetic products, said hydrophile synthetic products being oxyalkylation products of the acylation product obtained by reacting (A) a fusible carboxyl-containing, xylene-soluble, water-insoluble, low stage phenol-aldehyde resin; said resin being derived by reaction between a mixture of a difunctional monohydric hydrocarbon-substituted phenol and salicylic acid on the one hand, and formaldehyde on the other hand; the amount of salicylic acid employed in relation to the non-carboxylated phenol being in the range of 3 to 5 moles of phenol to 1 mole of salicylic acid; said resin being formed in the substantial absence of phenols of functionality greater than two and said phenol being of the formula

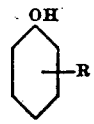

in which R is a hydrocarbon radical having at least 4 and not more than 14 carbon atoms and substituted in one of the positions ortho and para; with (B) an acylation-susceptible reactant which is an acylated derivative of a basic polyamino-alcohol of the formula

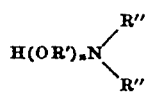

said acylated derivative thereof being such that there is at least one occurrence of the radical RCO, which is the acyl radical of a monocarboxy detergent-forming acid having at least 8 and not more than 32 carbon atoms; the amino nitrogen atom is basic; R″ is a member of the class of aminoalkanol radicals and polyaminoalkanol radicals, in which polyaminoalkanol radicals the amino nitrogen atoms are united by divalent radicals selected from the class consisting of alkylene radicals, alkyleneoxyalkylene radicals, hydroxyalkylene radicals, and hydroxyalkylene-oxyalkylene radicals, and all remaining amino nitrogen valences are satisfied by hydroxyalkyl radicals, including those in which the carbon atoms chain is interrupted at least once by an oxygen atom; R′ is an alkylene radical having at least 2 and not more than 10 carbon atoms; $n$ is a small whole number varying from 1 to 10; RCO is a substituent for a hydroxyl hydrogen atom; the molecular weight of said reactant not exceeding 25,000, said acylation product being characterized by linkage of said acylation-susceptible reactant to said resin at carboxy groups by reaction at carbon-linked hydroxyl groups; said oxyalkylated acylation product being characterized by introduction into the acylation product molecule of a plurality of divalent radicals having the formula $(R_1O)_n$, in which $R_1$ is a member selected from the class consisting of ethylene radicals, propylene radicals, butylene radicals, hydroxy propylene radicals and hydroxy butylene radicals, and $n$ is a numeral varying from 1 to 20, with the final proviso that the hydrophile properties of said oxyalkylated acylation product in an equal weight of xylene are sufficient to produce an emulsion when said xylene solution is shaken vigorously with 1 to 3 volumes of water.

12. Hydrophile synthetic products, said hydrophile synthetic products being oxyalkylation products of the acylation product obtained by reacting (A) a fusible carboxyl-containing, xylene-soluble, water-insoluble, low stage phenol-aldehyde resin; said resin being derived by reaction between a mixture of a difunctional monohydric hydrocarbon-substituted phenol and salicylic acid on the one hand, and formaldehyde on the other hand; the amount of salicylic acid employed in relation to the non-carboxylated phenol being in the ratio of 3 to 5 moles of phenol to 1 mole of salicylic acid; said resin being formed in the substantial absence of phenols of functionality greater than two and said phenol being of the formula

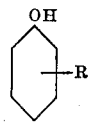

in which R is a hydrocarbon radical having at least 4 and not more than 14 carbon atoms and substituted in one of the positions ortho and para; with (B) an organic nitrogen-containing compound characterized by the presence of one nitrogen atom only per molecule, with the proviso that the remaining elements be carbon, hydrogen, and oxygen, and in which a hydroxyl group is the only acylation-susceptible radical; with the further proviso that the nitrogen-containing reactant be free from any organic radical having more than 32 carbon atoms, the molecular weight of said reactant not exceeding 25,000, said acylation product being characterized by linkage of said nitrogen-containing reactant to said resin at carboxy groups by reaction at carbon-linked hydroxyl groups; said oxyalkylated acylation product being characterized by introduction into the acylation product molecule of a plurality of divalent radicals having the formula $(R_1O)_n$, in which $R_1$ is a member selected from the class consisting of ethylene radicals, propylene radicals, butylene radicals, hydroxy propylene radicals and hydroxy butylene radicals, and $n$ in a numeral varying from 1 to 20, with the final proviso that the hydrophile properties of said oxyalkylated acylation product in an equal weight of xylene are sufficient to produce an emulsion when said xylene solution is shaken vigorously with 1 to 3 volumes of water.

13. Hydrophile synthetic products, said hydrophile synthetic products being oxyalkylation products of the acylation product obtained by reacting (A) a fusible carboxyl-containing, xylene-soluble, water-insoluble, low stage phenol-aldehyde resin; said resin being derived by reaction between a mixture of a difunctional monohydric hydrocarbon-substituted phenol and salicylic acid on the one hand, and an aldehyde having not over 8 carbon atoms and one functional group reactive toward both components of the mixture on the other hand; the amount of salicylic acid employed in reaction to the non-carboxylated phenol being sufficient to contribute at least one salicylic acid radical per resin molecule and the amount of non-carboxylated phenol being sufficient to contribute at least one non-carboxylated phenol radical per resin molecule; said resin being formed in the substantial absence of phenols of functionality greater than two and said phenol being of the formula

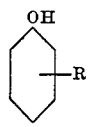

in which R is a hydrocarbon radical having at least 4 and not more than 14 carbon atoms and substituted in one of the positions ortho and para; with (B) a non-acylated polyamine of molecular weight not exceeding 25,000, said acylation product being characterized by linkage of said acylation-susceptible reactant to said resin at carboxy groups by reaction at nitrogen atoms; said oxyalkylated acylation product being characterized by introduction into the acylation product molecule of a plurality of divalent radicals having the formula $(R_1O)_n$, in which $R_1$ is a member selected from the class consisting of ethylene radicals, propylene radicals, butylene radicals, hydroxy propylene radicals and hydroxy butylene radicals, and $n$ is a numeral varying from 1 to 20, with the final proviso that the hydrophile properties of said oxyalkylated acylation product in an equal weight of xylene are sufficient to produce an emulsion when said xylene solution is shaken vigorously with 1 to 3 volumes of water.

14. Hydrophile synthetic products, said hydrophile synthetic products being oxyalkylation products of the acylation product obtained by reacting (A) a fusible carboxyl-containing, xylene-soluble, water-insoluble, low stage phenol-aldehyde resin; said resin being derived by reaction between a mixture of a difunctional monohydric hydrocarbon-substituted phenol and salicylic acid on the one hand, and formaldehyde on the other hand; the amount of salicylic acid employed in relation to the non-carboxylated phenol being sufficient to contribute at least one salicylic acid radical per resin molecule and the amount of non-carboxylated phenol being sufficient to contribute at least one non-carboxylated phenol radical per resin molecule; said resin being formed in the substantial absence of phenols of functionally greater than two and said phenol being of the formula

in which R is a hydrocarbon radical having at least 4 and not more than 14 carbon atoms and substituted in one of the positions ortho and para; with (B) a non-acylated polyamine of molecular weight not exceeding 25,000, said acylation product being characterized by linkage of said acylation-susceptible reactant to said resin at carboxy groups by reaction at nitrogen atoms; said oxyalkylated acylation product being characterized by introduction into the acylation product molecule of a plurality of divalent radicals having the formula $(R_1O)_n$, in which $R_1$ is a member selected from the class consisting of ethylene radicals, propylene radicals, butylene radicals, hydroxy propylene radicals and hydroxy butylene radicals, and $n$ is a numeral varying from 1 to 20, with the final proviso that the hydrophile properties of said oxyalkylated acylation product in an equal weight of xylene are sufficient to produce an emulsion when said xylene solution is shaken vigorously with 1 to 3 volumes of water.

15. Hydrophile synthetic products, said hydrophile synthetic products being oxyalkylation products of the aclyation product obtained by reacting (A) a fusible carboxyl-containing, xylene-soluble, water-insoluble, low stage phenol-aldehyde resin; said resin being derived by reaction between a mixture of a difunctional monohydric hydrocarbon substituted phenol and salicylic acid on the one hand, and formaldehyde on the other hand; the amount of salicylic acid employed in relation to the non-carboxylated phenol being in the range of 3 to 5 moles of phenol to 1 mole of salicylic acid; said resin being formed in the substantial absence of phenols of functionality greater than two and said phenol being of the formula

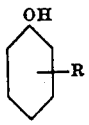

in which R is a hydrocarbon radical having at least 4 and not more than 14 carbon atoms and substituted in one of the positions ortho and para; with (B) a non-acylated polyamine of molecular weight not exceeding 25,000, said acylation product being characterized by linkage of said acylation-susceptible reactant to said resin at carboxy groups by reaction at nitrogen atoms; said oxyalkylated acylation product being characterized by introduction into the acylation product molecule of a plurality of divalent radicals having the formula $(R_1O)_n$, in which $R_1$ is a member selected from the class consisting of ethylene radicals, propylene radicals, butylene radicals, hydroxy propylene radicals and hydroxy butylene radicals, and $n$ is a numeral varying from 1 to 20, with the final proviso that the hydrophile properties of said oxyalkylated acylation product in an equal weight of xylene are sufficient to produce an emulsion when said xylene solution is shaken vigorously with 1 to 3 volumes of water.

MELVIN DE GROOTE.
BERNHARD KEISER.

No references cited.